United States Patent
Yasukawa et al.

(10) Patent No.: US 11,601,892 B2
(45) Date of Patent: Mar. 7, 2023

(54) USER APPARATUS AND TRANSMISSION POWER CONTROL METHOD

(71) Applicant: NTT DOCOMO, INC., Tokyo (JP)

(72) Inventors: Shinpei Yasukawa, Tokyo (JP); Satoshi Nagata, Tokyo (JP); Ryosuke Osawa, Tokyo (JP); Shaozhen Guo, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/644,413

(22) PCT Filed: Sep. 8, 2017

(86) PCT No.: PCT/JP2017/032568
§ 371 (c)(1),
(2) Date: Mar. 4, 2020

(87) PCT Pub. No.: WO2019/049332
PCT Pub. Date: Mar. 14, 2019

(65) Prior Publication Data
US 2021/0068059 A1    Mar. 4, 2021

(51) Int. Cl.
*H04W 52/24* (2009.01)
*H04W 52/14* (2009.01)
(Continued)

(52) U.S. Cl.
CPC ....... *H04W 52/242* (2013.01); *H04W 52/146* (2013.01); *H04W 52/36* (2013.01); *H04W 72/0473* (2013.01)

(58) Field of Classification Search
CPC . H04W 52/242; H04W 52/146; H04W 52/36; H04W 72/0473
See application file for complete search history.

(56) References Cited

U.S. PATENT DOCUMENTS 10,568,040 B2    2/2020   Takeda et al.
2014/0153536 A1  6/2014   Ouchi et al.
(Continued)

FOREIGN PATENT DOCUMENTS

CN    103327594 A    9/2013
CN    103718598 A    4/2014
(Continued)

OTHER PUBLICATIONS

3GPP TS 36.213 V14.3.0 "3rd Generation Partnership Project; Technical Specification Group Radio Access Network; Evolved Universal Terrestrial Radio Access (E-UTRA); Physical layer procedures (Release 14)" Jun. 2017 (460 pages).
(Continued)

*Primary Examiner* — Samina F Choudhry
(74) *Attorney, Agent, or Firm* — Osha Bergman Watanabe & Burton LLP

(57) ABSTRACT

A user apparatus in a wireless communication system including a base station and a user apparatus, includes a signal reception part that receives, from the base station, a plurality of power control parameters that become candidates for power control parameters to be used by the user apparatus, a transmission power determination part that selects power control parameters to be used, from the plurality of power control parameters, and determines a transmission power of a UL signal, based on the selected power control parameters and a pathloss estimation value, and a signal transmission part that transmits the UL signal using the transmission power determined by the transmission power determination part.

5 Claims, 17 Drawing Sheets

(51) Int. Cl.
*H04W 52/36* (2009.01)
*H04W 72/044* (2023.01)

(56) References Cited

U.S. PATENT DOCUMENTS

| | | | |
|---|---|---|---|
| 2014/0185481 A1 | 7/2014 | Seol et al. | |
| 2015/0105119 A1 | 4/2015 | Eriksson et al. | |
| 2015/0110023 A1 | 4/2015 | Pan et al. | |
| 2015/0358920 A1* | 12/2015 | Sorrentino | H04W 52/242 |
| | | | 455/522 |
| 2016/0345272 A1 | 11/2016 | Eriksson et al. | |
| 2019/0059058 A1* | 2/2019 | Chen | H04W 52/146 |

FOREIGN PATENT DOCUMENTS

| | | | |
|---|---|---|---|
| CN | 104272816 A | 1/2015 | |
| JP | 2012222488 A | 11/2012 | |
| JP | 201334113 A | 2/2013 | |
| JP | 2016506681 A | 3/2016 | |
| WO | 2017142029 A1 | 8/2017 | |
| WO | WO-2018128851 A2 * | 7/2018 | H04J 11/005 |

OTHER PUBLICATIONS

3GPP TS 36.331 V14.3.0 "3rd Generation Partnership Project; Technical Specification Group Radio Access Network; Evolved Universal Terrestrial Radio Access (E-UTRA); Radio Resource Control (RRC); Protocol specification (Release 14)" Jun. 2017 (745 pages).
International Search Report issued in International Application No. PCT/JP2017/032568, dated Oct. 3, 2017 (3 pages).
Written Opinion issued in International Application No. PCT/JP2017/032568; dated Oct. 3, 2017 (3 pages).
Extended European Search Report issued in counterpart European Patent Application No. 17924697.0, dated Mar. 16, 2021 (10 pages).
Office Action issued in Japanese Application No. 2019-540253; dated Jun. 15, 2021 (5 pages).
Office Action issued in Japanese Application No. 2019-540253; dated Sep. 14, 2021 (6 pages).
Office Action issued in Chinese Application No. 201780094588.3; dated Dec. 23, 2022 (21 pages).

* cited by examiner

FIG.1
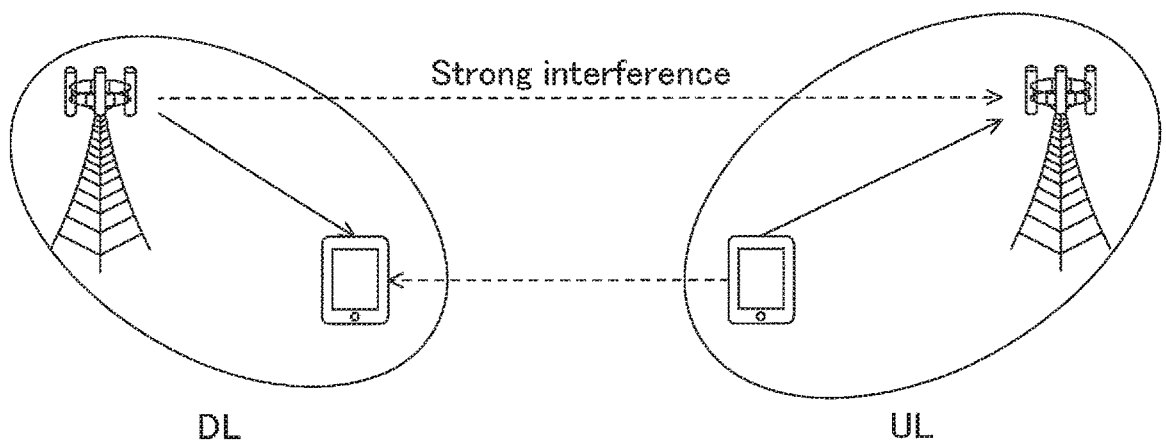
FIG.2
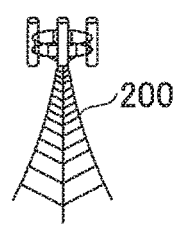
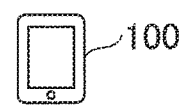

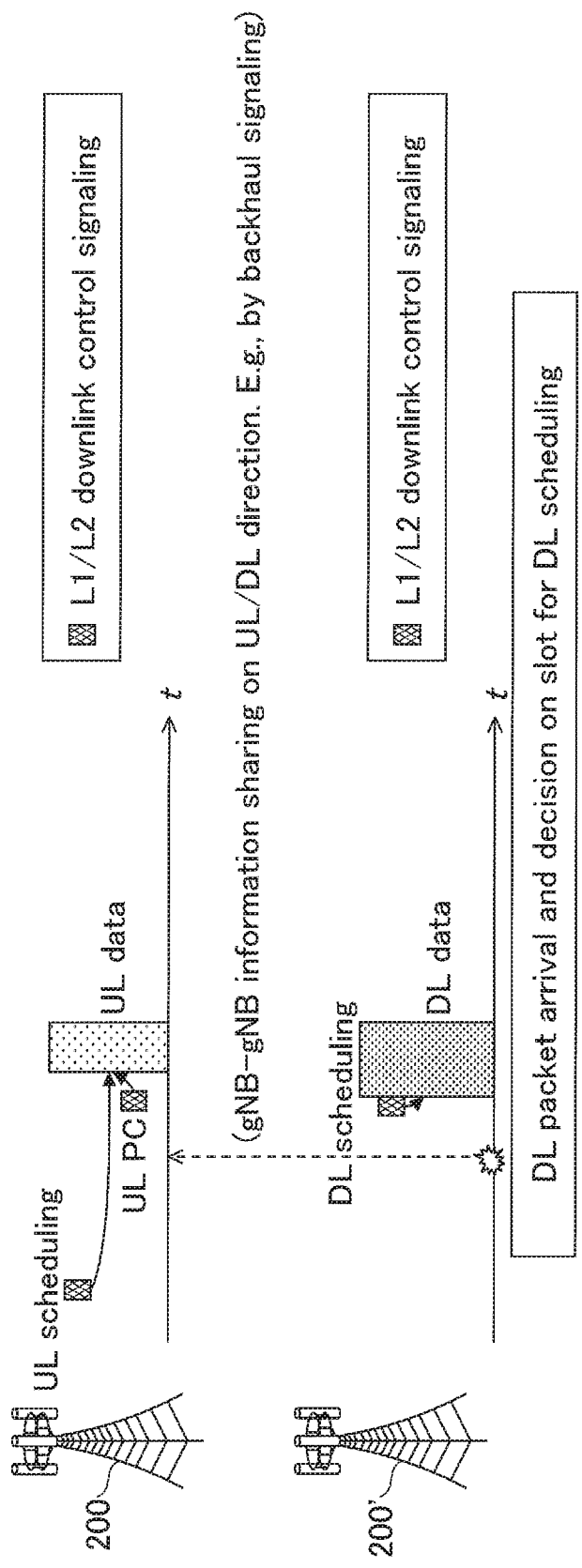

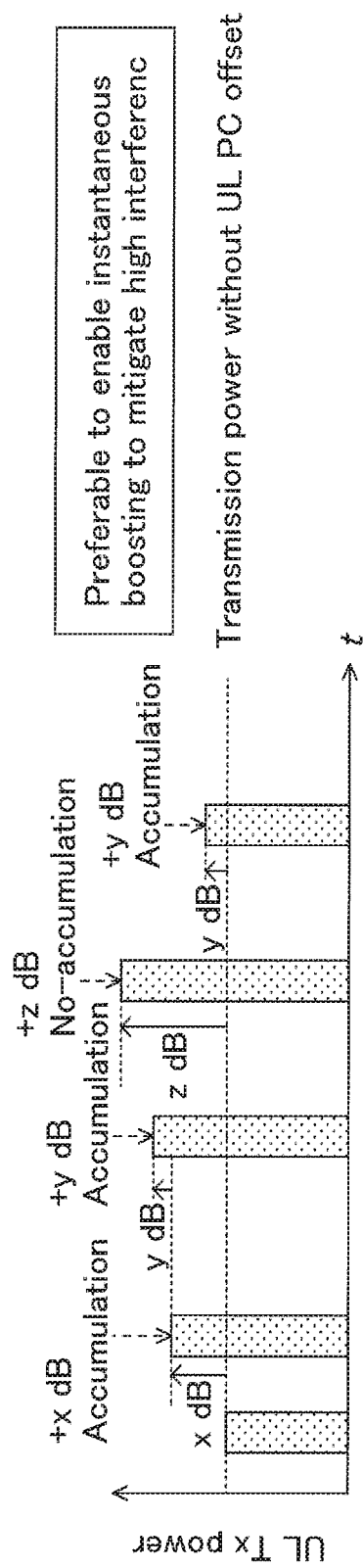

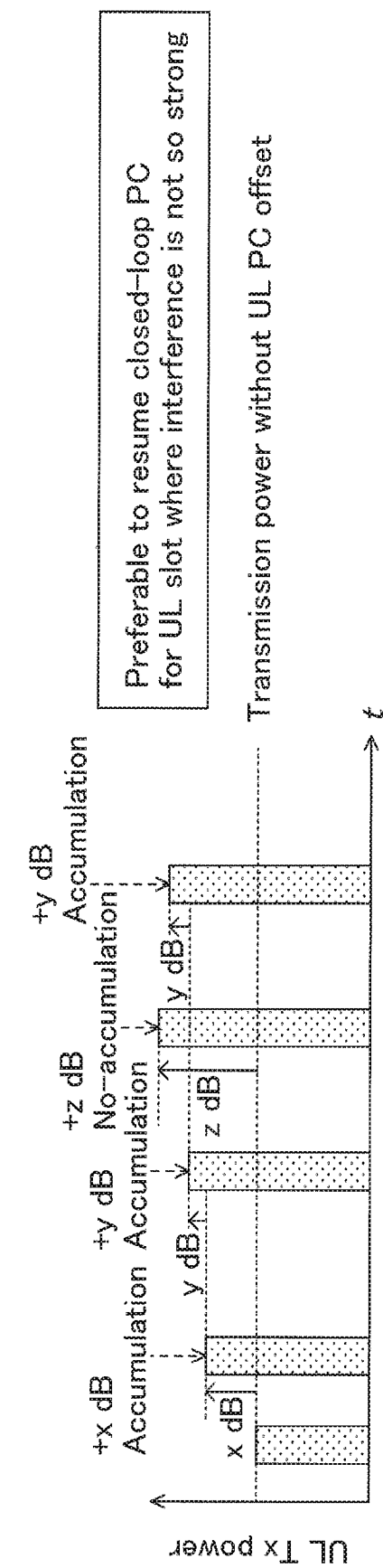

FIG.9A
FIG.9B
Parameter set#1 (0, 2, ...)
Parameter set#2 (1, 5, ...)
Parameter set#3 (3, 8, ...)
FIG.10A
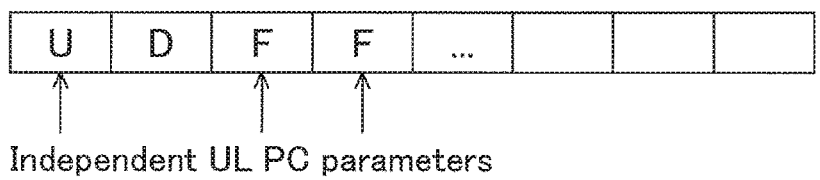
Independent UL PC parameters
FIG.10B
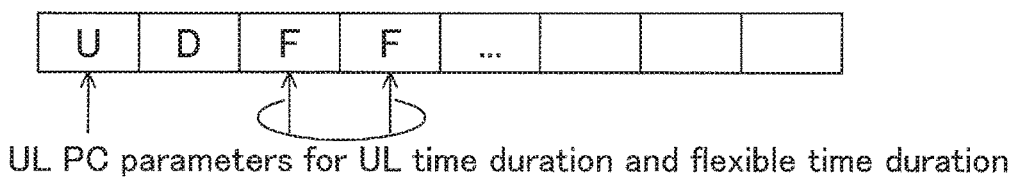
UL PC parameters for UL time duration and flexible time duration

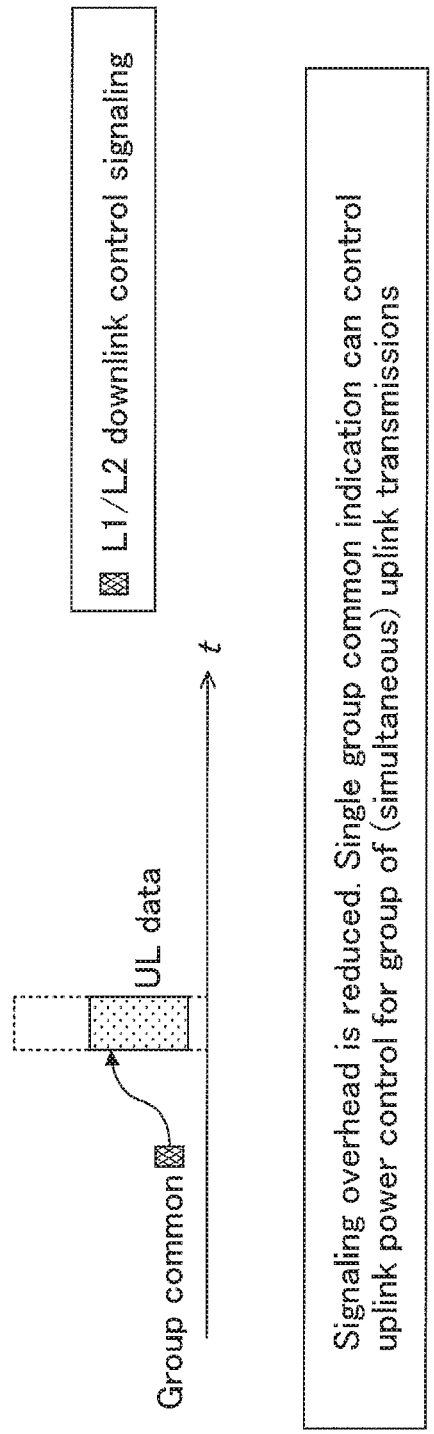

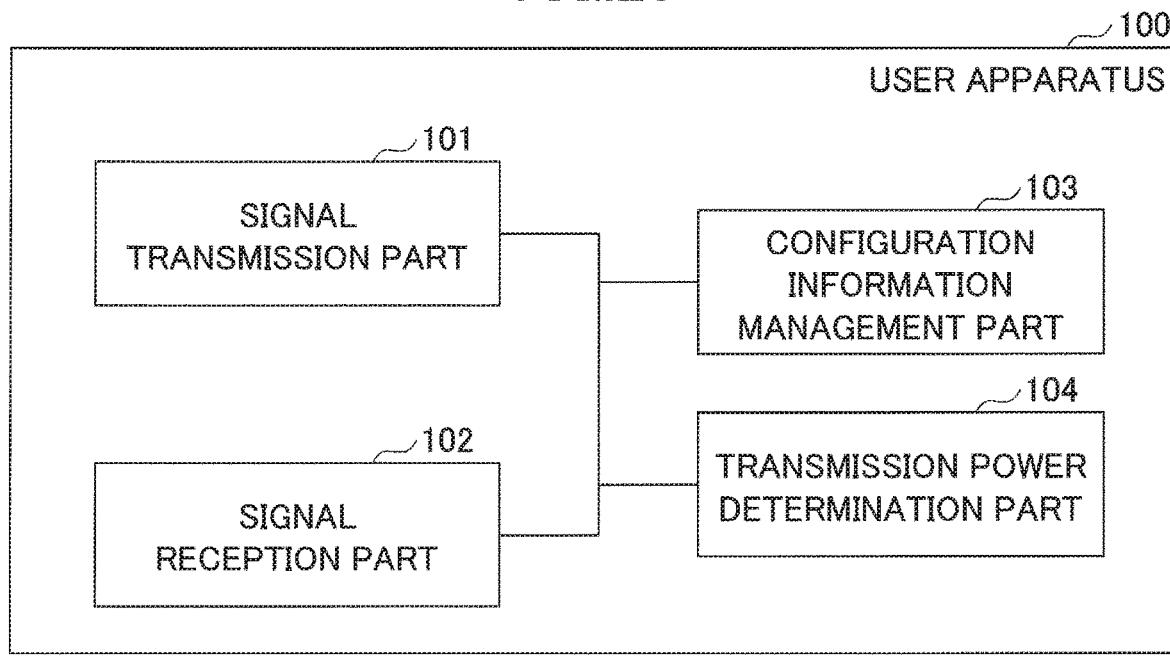
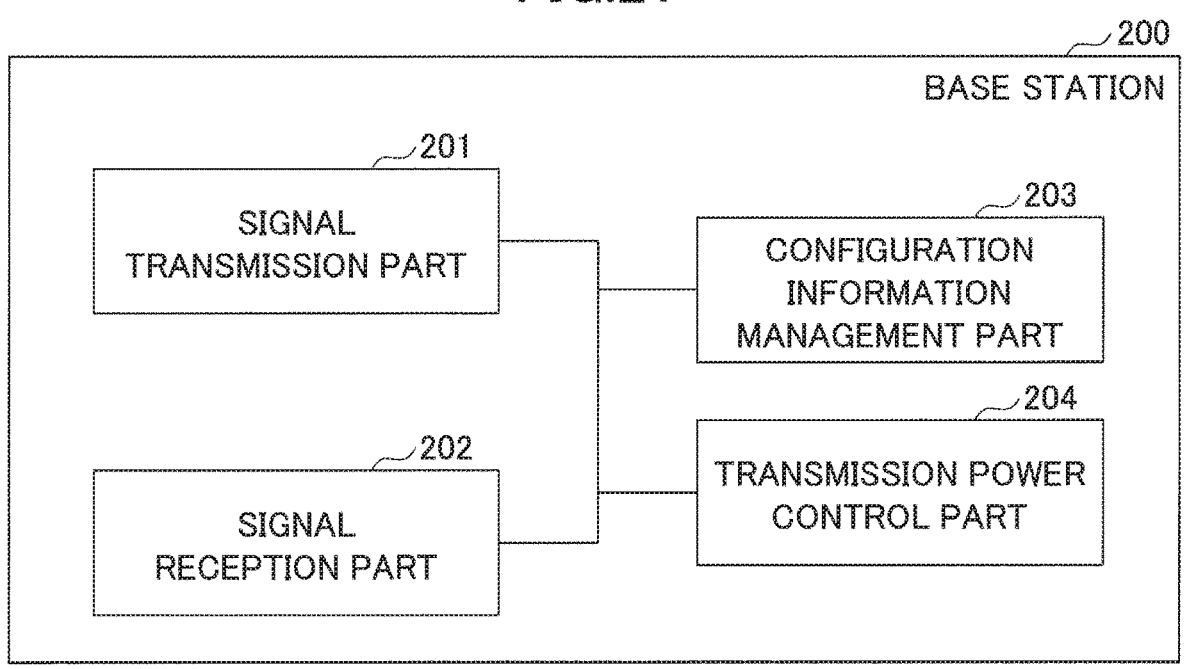

USER APPARATUS AND TRANSMISSION POWER CONTROL METHOD

TECHNICAL FIELD

The present invention relates to a user apparatus in a wireless communication system.

BACKGROUND ART

Presently, in 3GPP (Third Generation Partnership Project), next-generation systems referred to as NR (New Radio) or 5G (that uses NR), that are successors to LTE (Long Term Evolution)-Advanced that is one of the fourth generation wireless communication systems, are discussed. In the NR, mainly three use cases are assumed, namely, eMBB (extended Mobile Broadband), mMTC (massive Machine Type Communication), and URLLC (Ultra Reliability and Low Latency Communication).

Further, in the NR, the use of dynamic TDD (Time Division Duplex) that dynamically switches uplink (hereinafter UL) slots and downlink (hereinafter DL) slots for every duration, is discussed.

In addition, among the three use cases described above, the URLLC is aimed at realizing wireless communication with low delay and high reliability. As a specific measure for realizing the low delay in the URLLC, introduction of Short TTI length (also referred to as subframe length, subframe interval), reducing control delay from packet generation to data transmission, or the like are discussed. Moreover, as a specific measure for realizing the high reliability in the URLLC, introduction of modulation schemes and encoding schemes with low encoding rate for realizing a low bit error rate, utilizing diversity, or the like, are discussed.

In the URLLC, there is a possibility of sudden generation of transmission data having a high degree of urgency, and it is necessary to transmit the suddenly generated data with the low delay and high reliability.

In a case in which the data to be transmitted is generated at a user apparatus, in UL communication of LTE, for example, SR (Scheduling Request) is first transmitted with respect to a base station, to request allocation of a resource to the base station. The base station outputs UL grant (UL transmission enable) to notify the resource allocation to the user apparatus, and the user apparatus transmits the data at the resource specified from the base station.

However, in the URLLC, there is a possibility of sudden generation of data to be transmitted, as described above. In a case in which the data transmission is performed based on the UL grant, as described above, there is a possibility that a requested condition of low delay can no longer be satisfied.

Accordingly, Grant free UL transmission, that allocates overlapping (or orthogonal) UL resources to a plurality of user apparatuses in advance by upper layer signaling, to enable the user apparatus to perform the UL data transmission without receiving the UL grant, is discussed. In the Grant free UL transmission, various systems including a system that uses a spreading code specific to the user apparatus, a system that uses interleaving, or the like are discussed, in order to enable the base station to identify and separate the data received from the plurality of user apparatuses. From the viewpoint of achieving low delay of the UL data transmission, the Grant free UL transmission is one of the effective means. The Grant free UL transmission is an UL transmission method that does not successively allocate the resource from the base station with respect to one or a plurality of transport blocks transmitted at a certain timing.

The Grant free UL transmission may be an UL transmission in which the user apparatus selects the resource from predetermined or preconfigured resource candidates, or a UL transmission based on SPS (Semi-Persistent Scheduling) set to the user apparatus from the base station, and includes a form that employs combined use of a downlink L1/L2 control signal for activating, inactivating, or updating the resource.

PRIOR ART DOCUMENTS

Non-Patent Documents

Non-Patent Document 1: 3GPP TS 36.213 V14.3.0 (2017-06)
Non-Patent Document 2: 3GPP TS 36.331 V14.3.0 (2017-06)

DISCLOSURE OF THE INVENTION

Problem to be Solved by the Invention

In the base station that receives the UL signal, it is necessary to perform an appropriate UL power control, in order to appropriately demodulate the UL signal. However, no specific UL power control has been proposed in the NR including the form that transmits the UL signal without the UL grant. As the UL signal that is transmitted without the UL grant, there are various kinds of reference signals (for example, SRS (Sounding Reference Signal) other than the data signal of the Grant free UL described above.

The present invention is conceived in view of the above, and one object is to provide an UL power control technique with respect to the UL signal that is transmitted without receiving the UL grant.

Means of Solving the Problem

According to the disclosed embodiments, a user apparatus in a wireless communication system including a base station and a user apparatus, is characterized in that there are provided:

a signal reception part that receives, from the base station, a plurality of power control parameters that become candidates for power control parameters to be used by the user apparatus;

a transmission power determination part that selects power control parameters to be used, from the plurality of power control parameters, and determines a transmission power of an UL signal, based on the selected power control parameters and a pathloss estimation value; and a signal transmission part that transmits the UL signal using the transmission power determined by the transmission power determination part.

Effects of the Invention

According to the disclosed embodiments, it is possible to provide an UL power control technique with respect to the UL signal that is transmitted without receiving the UL grant.

BRIEF DESCRIPTION OF THE DRAWINGS

FIG. 1 is a diagram illustrating an interference between adjacent cells in dynamic TDD.

FIG. 2 is a diagram illustrating a configuration of the wireless communication system in one embodiment of the present invention.

FIG. 6 is a diagram illustrating the DL control signaling of the individual system.

FIG. 7 is a diagram illustrating accumulation of an UL power control offset.

FIG. 8 is a diagram illustrating the accumulation of the UL power control offset.

FIG. 9A is a diagram illustrating power control parameters notified by a time region pattern.

FIG. 9B is a diagram illustrating the power control parameters notified by the time region pattern.

FIG. 10A is a diagram illustrating the power control parameters notified by the time region pattern.

FIG. 10B is a diagram illustrating the power control parameters notified by the time region pattern.

FIG. 11 is a diagram illustrating the DL control signaling of a Group Common system.

FIG. 20 is a diagram illustrating an example of a functional structure of a user apparatus 100.

FIG. 21 is a diagram illustrating an example of a functional structure of a base station 200.

MODE OF CARRYING OUT THE INVENTION

Figure 3:
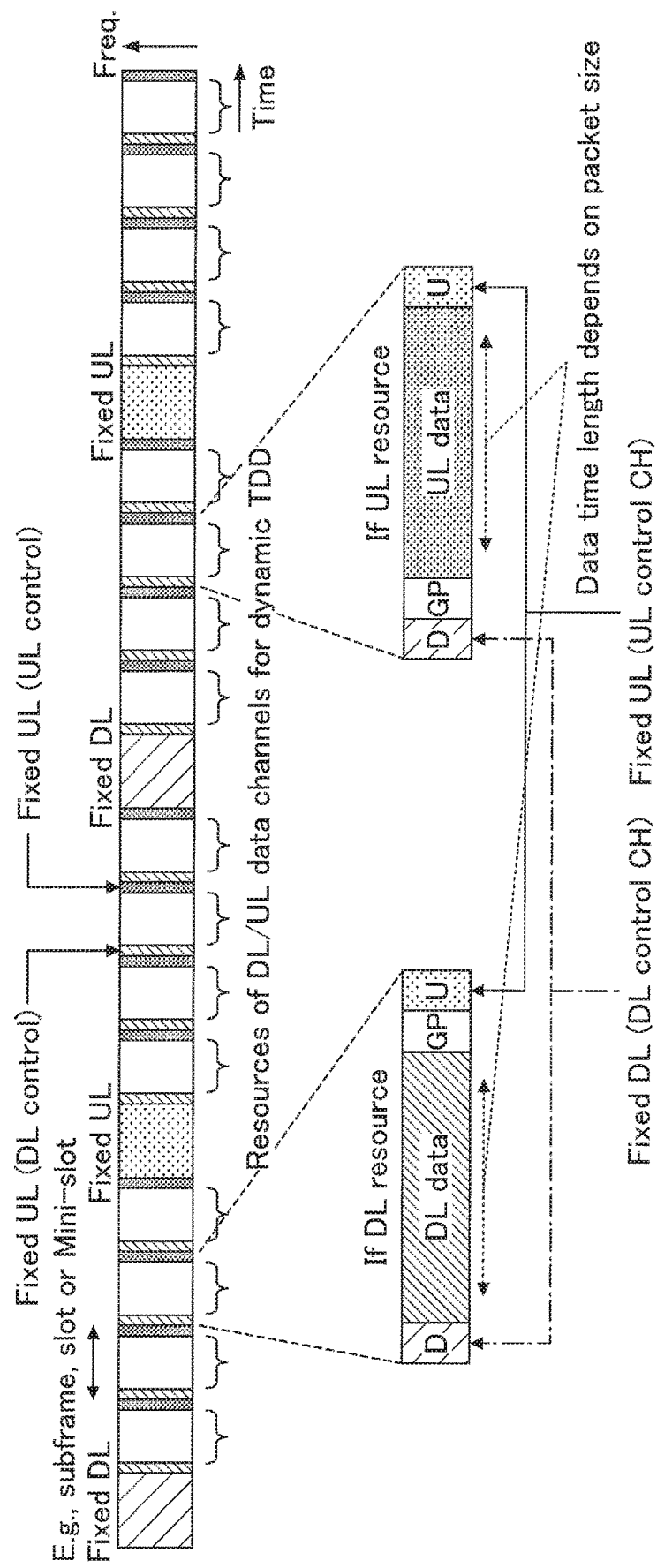
FIG. 3 is a diagram illustrating an example of a frame structure of the dynamic TDD.

A description will hereinafter be given of embodiments of the present invention (aspects of embodiments) by referring to the drawings. The embodiments described in the following are merely examples, and the embodiments to which the present invention may be applied are not limited to the following embodiments.

The embodiments described hereunder use terminologies such as SRS, PUSCH, RRC, DCI, UL, Grant, or the like used in the existing LTE for the sake of convenience, however, channels, signals, functions, or the like similar to these may be referred to by other names.

Structure of Wireless Communication System

In this embodiment, a user apparatus is disclosed, which performs wireless communication with a base station (gNB) by dynamic TDD, for example. In the dynamic TDD, there is a possibility of simultaneously allocating slots in different transmission directions between a residing base station and an adjacent base station, and as illustrated in FIG. 1, a DL transmission from the residing base station allocated with the DL slot may interference with an UL transmission of the adjacent base station allocated with the UL slot. The use of the dynamic TDD is an example, and this embodiment may use a scheme of statically (or semi-statically) allocating the transmission direction without using the dynamic TDD.

In general, an UL power control includes an open loop scheme in which the user apparatus controls the power based on a pathloss or the like measured by the user apparatus, and a closed loop scheme in which the user apparatus controls the power based on dynamic signaling from the base station. In this embodiment, the user apparatus sets the UL transmission power based on power control parameters or the like notified from the base station. The power control parameters notified to the user apparatus are dynamically adjusted with respect to a predicted interference level or the like, for example, and thus, the generation of the interference can be avoided.

First, a wireless communication system in this embodiment will be described, by referring to FIG. 2. FIG. 2 is a diagram schematically illustrating a wireless communication system in this embodiment.

As illustrated in FIG. 2, a wireless communication system 10 includes a user apparatus 100 and a base station 200. The wireless communication system 10 may be one of wireless communication systems prescribed by the 3GPP, such as the LTE system, the LTE-Advanced system, the NR system, or the like, or may be one of other wireless communication systems.

The user apparatus 100 is an information processing apparatus communicable with and connectable to the base station 200, and is not limited to a specific apparatus. For example, the user apparatus 100 may be a mobile phone, a smartphone, a tablet, a wearable apparatus, or the like.

The base station 200 performs wireless communication with a large number of user apparatuses including the user apparatus 100, under control of an upper station (not illustrated) such as a core network or the like. In the LTE system and the LTE-Advanced system, the base station 200 may be referred to as an eNB (evolved NodeB), for example, and in the NR system, the base station 200 may be referred to as a gNB, for example. Only one base station 200 is illustrated in the example illustrated in FIG. 2, however, a large number of base stations are typically arranged to cover a coverage area of the wireless communication system 10.

In addition, signal waveforms used in the wireless communication system in this embodiment may be OFDMA for both UL and the DL, similarly to the DL of the existing LTE, or SC-FDMA/OFDMA for the UL/DL, similarly to the UL/DL of the existing LTE, or signal waveforms other than these OFDMA and SC-FDMA/OFDMA.

A power control scheme in this embodiment is not only applicable to the UL but is also applicable to a sidelink (SL).

Moreover, the base stations are connected by a communication line (referred to as a backhaul), and information can be transmitted and received between the base stations using an X2 interface, for example.

FIG. 3 is a diagram illustrating an example of a radio frame structure of the wireless communication system in this embodiment. It is assumed that this example of the wireless frame structure is applied to a case in which the dynamic TDD is performed, however, the wireless frame structure illustrated in FIG. 3 may be used in a case in which the dynamic TDD is not performed.

In the example illustrated in FIG. 3, a time width (width indicated as "E.g., subframe, slot or Mini-slot") of one rectangular frame may also be referred to as "time interval" or "TTI".

In the example illustrated in FIG. 3, the UL/DL is fixedly set in some of the time intervals, and in a certain period within these time intervals (in the illustrated example, the DL and the UL are fixedly set in the period at both ends within these time intervals), and only the set communication direction is permitted in these time intervals. On the other hand, in the other remaining time intervals, the UL communication/DL communication can be made.

For the sake of convenience, the "time interval" described above is referred to as a slot in the following description. However, the slot that is used in the following may be replaced by a TTI (Transmission Time Interval), a unit time length frame, a subframe, and a mini-slot. The time length of the slot may be a fixed time length that does not change with lapse of time, or a time length that changes according to a packet size or the like.

As illustrated in FIG. 3, one slot in this example may include a head time period for downlink control channel (DL control channel period), a time period for data communication (data period), and a tail time period for uplink control channel (UL control channel period). The slot may include a transmission period of a reference signal. In addition, depending on the needs, the transmission may be made using a slot structure formed solely from the required channels, such as the structure of the head time period for downlink control channel (DL control channel period), and the structure of the time period for data communication (data period). A GP (Guard Period) for switching is provided at a boundary between the DL and the UL.

As an example, the UL control CH may be transmitted in a short time (for example, one symbol). The UL control CH of such a short time is referred to as Short PUCCH.

Figure 4:
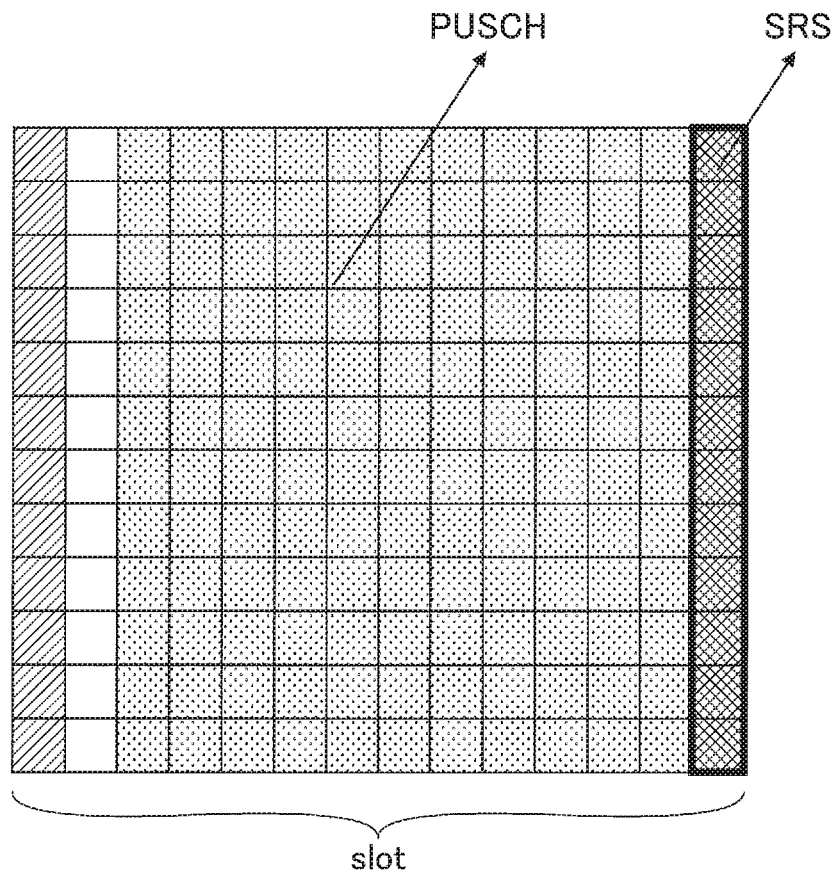
FIG. 4 is a diagram illustrating an example of SRS.

In addition, FIG. 4 illustrates an example of a SRS (Sounding Reference Signal) in this embodiment. FIG. 4 illustrates one resource block as an example, wherein the abscissa indicates a time direction made up of a plurality of symbols, and the ordinate indicates a frequency direction made up of a plurality of subcarriers.

The SRS is a reference signal used by the base station 200 to estimate a state of an UL channel. In addition, in the NR, the SRS may also be used for measuring an interference from a user apparatus in an adjacent cell. In the example illustrated in FIG. 4, the SRS is mapped to a last symbol of the slot.

In an exemplary implementation 1 which will be described later, a description will be given of a transmission power control of the SRS. However, the SRS is an example of the reference signal, and a power control system similar to the power control system described in the exemplary implementation 1 may be applied with respect to reference signals other than the SRS.

In this embodiment, examples of the UL power control with respect to the UL signal the user apparatus 100 is able to transmit without receiving the UL grant, an UL power control with respect to the SRS is described as the exemplary implementation 1, and an UL power control with respect to a Grant free PUSCH (data signal) is described as an exemplary implementation 2.

Before describing the exemplary implementation 1 and the exemplary implementation 2, a description will first be given of an example of the UL power control with respect to a normal PUSCH that is transmitted by receiving the UL grant (DCI), as a basic operation example in the wireless communication system of this embodiment. The transmission power control in this operation example will be referred to as a "DCI based power control".

DCI Based Power Control

In the DCI based power control with respect to the normal PUSCH, a plurality of power control parameters, together with corresponding indexes, are notified from the base station 200 to the user apparatus 100 by broadcast (for example, SIB), or upper layer signaling (for example, UE specific RRC signaling). The "power control parameters" are a set of target reception power (P0) used for open loop control, a pathloss compensation value ($\alpha$), or the like, for example.

In addition, a plurality of power offset (boosting) indicators used for closed loop control, together with values of each of the power offsets, are notified from the base station 200 with respect to the user apparatus 100 by broadcast (for example, SIB), or upper layer signaling (for example, UE distinct RRC signaling).

Further, time region pattern indexes and power control parameters for each index (for example, values of power control parameters at each time position) are notified from the base station 200 to the user apparatus 100 by broadcast (for example, SIB), or upper layer signaling (for example, UE specific RRC signaling).

As will be described later in more detail, the power control parameters or the like actually used by the user apparatus 100 are notified from the base station 200 with respect to the user apparatus 100 by specifying specific indexes or the like by the DCI or the like.

More particularly, in the DCI based power control in this embodiment, the power control parameters or the like are transmitted from the base station 200 to the user apparatus 100 by a UE specific scheme, a Group Common scheme, or a scheme that is a combination of the UE specific scheme and the Group Common scheme. The user apparatus 100 determines the UL transmission power according to the power control parameters or the like.

The power control parameters in this embodiment (and similarly in the exemplary implementations 1 and 2) are parameters such as P0 (target reception power such as P0_pusch or the like), $\alpha$, $\delta$, or the like disclosed in Non-Patent Document 1, for example. $\delta$ may be referred to as a power offset. $\alpha$ is a parameter that is multiplied to a pathloss (PL) that is estimated by the user apparatus 100. For example, the user apparatus 100 uses these parameters to determine (calculate) the UL transmission power for each subframe (or each slot), and transmits the UL signal (data signal by PUSCH in this example).

A formula based on the following formula 1, for example, may be used to determine the UL transmission power.

$$\text{PUSCH transmission power} = P0\_\text{pusch} + \alpha \times PL + \delta + MP \quad \text{Formula 1}$$

In the formula 1 above, PL denotes a pathloss of the DL measured and calculated by the user apparatus 100. This PL becomes an estimation value of the UL pathloss. In addition, MP denotes a power control parameter (for example, an amount based on MCS, using band) other than P0_pusch and α.

First, a notification process of the power control parameters by the UE specific scheme in the DCI based power control will be described. In the UE specific scheme, the parameters for the power control are individually notified to the user apparatus 100 by the power control parameter index, the power offset indicator, and/or the time region pattern index of the UL power control.

Figure 5:
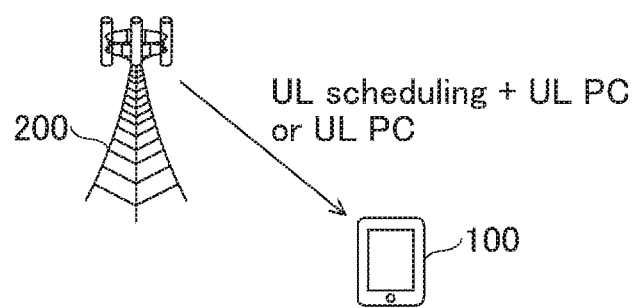
FIG. 5 is a diagram illustrating a DL control signaling of an individual system.

More particularly, the power control parameter index is individually notified to the user apparatus 100 by DL control signaling for UL scheduling or DL control signaling exclusively for UL power control, for example, as illustrated in FIG. 5. The "DL control signaling" is the DCI transmitted by the PDCCH, however, the "DL control signaling" is not limited to such.

In the former case, the power control parameter index is notified to the user apparatus 100 together with UL scheduling information. On the other hand, in the latter case, the power control parameter index may be notified after the UL scheduling information, and the base station 200 may determine appropriate power control parameters by sharing, with an adjacent base station 200', the UL/DL information of the dynamic TDD by backhaul signaling or the like. For example, as illustrated in FIG. 6, the base station 200 may exchange the UL/DL information of the dynamic TDD with the adjacent base station 200' after transmitting the UL scheduling information to the user apparatus 100, to determine the power control parameters based on the UL/DL information, and notify the determined power control parameter index to the user apparatus 100. For example, when the user apparatus 100 is located at the edge of the cell, the base station 200 may set a relatively low UL transmission power to the user apparatus 100, so that the UL transmission from the user apparatus 100 does not interfere with the DL transmission to the user apparatus in an adjacent cell.

In addition, the parameters for the power control may be individually notified to the user apparatus 100 by the power offset (boosting) indicators. More particularly, a flag (accumulation invalid/valid information) of the DL control signaling may be introduced to activate or inactivate accumulation of the power offset. In a case in which the accumulation is activated, the user apparatus 100 may accumulate the notified power offset to the UL transmission power.

On the other hand, in a case in which the accumulation is inactivated, the user apparatus 100 may clear the power offset accumulated until the reception of the flag indicating the inactivation, and apply the notified power offset as the UL transmission power. For example, as illustrated in FIG. 7, when the accumulation is inactivated (no-accumulation), the user apparatus 100 clears an amount corresponding to z dB accumulated up to that point in time, and sets the UL transmission power by the transmission power accumulated with a newly notified power offset y dB. According to this power control system, it is possible to reduce the strong interference by instantaneous boosting.

Alternatively, in the case in which the accumulation is inactivated, the user apparatus 100 may ignore only the power offset accumulated before the reception of the flag indicating the inactivation, and accumulate the notified power offset. In other words, the power offset notified at the time of the reception of the flag is not accumulated, however, the power offset accumulated up to that point in time is not cleared. For example, as illustrated in FIG. 8, when the accumulation is inactivated (no-accumulation), the user apparatus 100 accumulates the currently notified y dB to the power offset y dB accumulated up to a previous accumulation. This power control system is suited for resuming the closed loop power control with respect to the UL slot where the interference is not very strong.

In addition, the parameters for the power control may be individually notified to the user apparatus 100 by the time region pattern index of the UL power control. The time region pattern index of the UL power control corresponds to a set of the power control parameters to be applied to the scheduled UL transmission with respect to a time bit map. More particularly, as illustrated in FIG. 9A, the power control parameters are notified by each bit of the time bit map of the scheduled UL transmission. In the particular example illustrated in FIG. 9A, power control parameters "x", "y", "x", and "z" are respectively allocated to bits "0", "1", "2", and "3" of the time bit map. Alternatively, as illustrated in FIG. 9B, the time indexes applied to the power control parameter set may be notified with respect to each of the power control parameter sets. In the particular example illustrated in FIG. 9B, a power control parameter set #1 is applied to the time indexes "0", "2", . . . , a power control parameter set #2 is applied to the time indexes "1", "5", . . . , and a power control parameter set #3 is applied to the time indexes "3", "8", . . . .

The unit of time of the time region pattern may be set by the upper layer, or may be presubscribed. The time region pattern indexes of the UL power control may be configured by a TDD UL/DL configuration, and the power control parameters may be configured to each UL time index or each flexible time index (may be set to UL when scheduled) for the configured UL/DL configuration. For example, as illustrated in FIG. 10A, independent power control parameters may be set with respect to each of an UL slot (U) and a flexible slot (F). In addition, as illustrated in FIG. 10B, common power control parameters may be configured with respect to two consecutive flexible slots (F).

Next, the notification process of the parameters for the power control according to a Group Common scheme in the DCI based power control will be described. In the Group Common scheme, the parameters for the power control are collectively notified to a group of user apparatuses 100 by the power control parameter index, the power offset (boosting) indicator, and/or the time region pattern index of the UL power control, according to the Group Common scheme. More particularly, the UL slot type, the power offset indicator, the power control parameter set index, or the UL power control process index (hereinafter referred to as a process ID in this specification) are collectively notified to the group of the user apparatuses 100, and each user apparatus 100 within the group sets the UL transmission power according to the common UL slot type, power offset indicator, power control parameter set index, or process ID. For example, as illustrated in FIG. 11, the parameters for the power control may be collectively notified to the group of the user apparatuses 100 by L1/L2 DL control signaling. The L1/L2 DL control signaling in this case is the DCI transmitted by the Group Common PDCCH, for example. According to the Group Common scheme, it is possible to perform the UL power control with respect to the group making simultaneous UL transmission by one Group Common notification, and reduce the signaling overhead compared to the UE specific scheme.

Figure 12A:
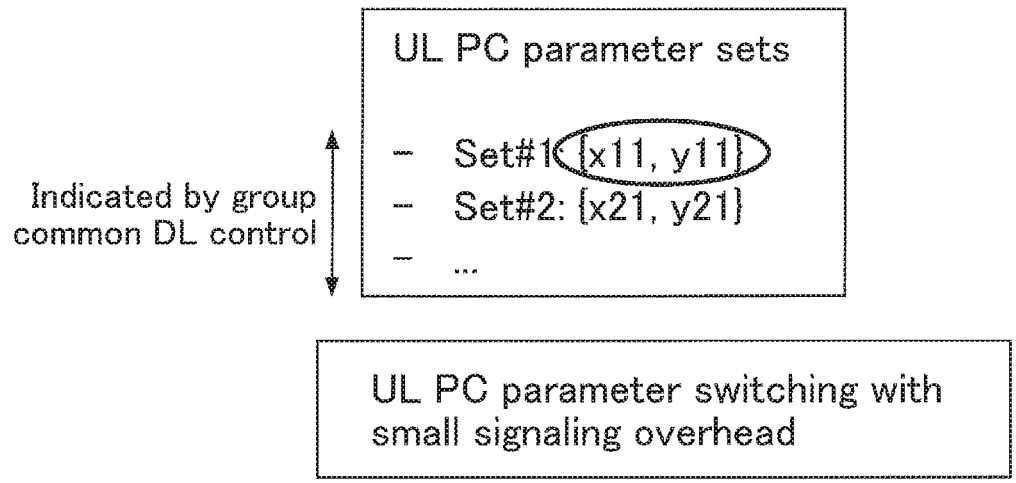
FIG. 12A is a diagram illustrating a power control parameter set index that is notified by a Group Common scheme.
Figure 12B:
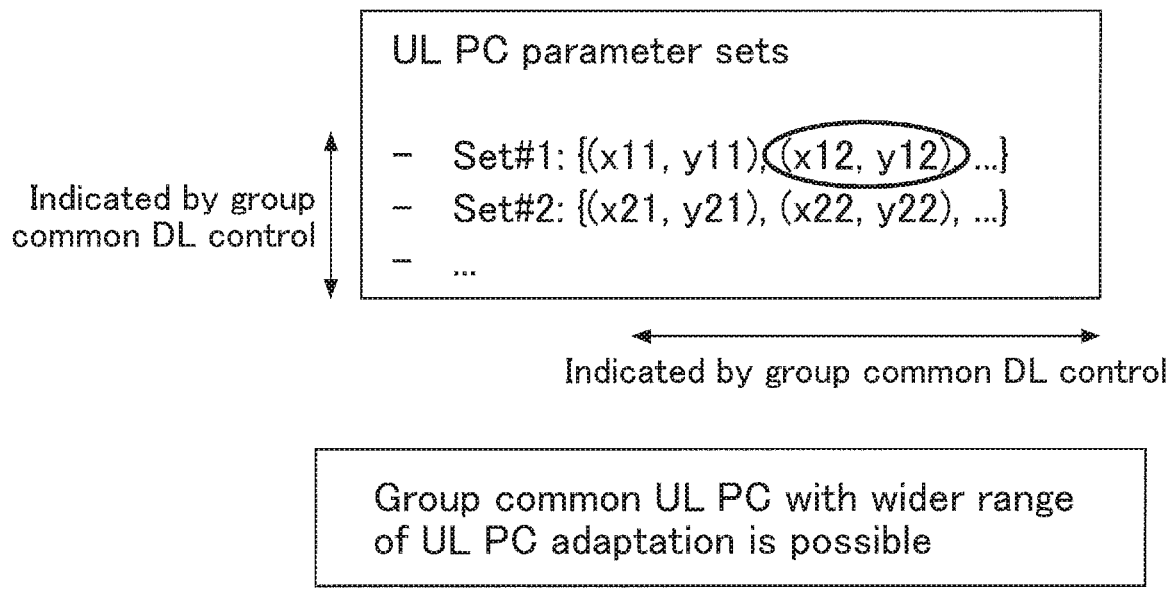
FIG. 12B is a diagram illustrating the power control parameter set index that is notified by the Group Common scheme.

In addition, in the Group Common scheme, each power control parameter set may be defined, and the power control parameter set index that is applied may be notified according to the group common scheme, as illustrated in FIG. 12A. In the particular example illustrated in FIG. 12A, a power control parameter set #1 includes power control parameters x11 and y11, and a power control parameter set #2 includes power control parameters x21 and y21. For example, when the power control parameter set #1 is notified to the group of the user apparatuses 100 according to the Group Common scheme, each user apparatus 100 sets the UL transmission power according to the power control parameters x11 and y11. Alternatively, as illustrated in FIG. 12B, each power control parameter set may be related to a set of a plurality of power control parameters, and the power control parameter set index that is applied and the power control parameters within the corresponding power control parameter set may be notified according to the Group Common scheme. In the particular example illustrated in FIG. 12B, when an UL power parameter set #1 and power control parameters (x12 and y12) within the UL power parameter set #1 are notified to the group of the user apparatuses 100 according to the Group Common scheme, each user apparatus 100 sets the UL transmission power according to the power control parameters x12 and y12.

Figure 13:
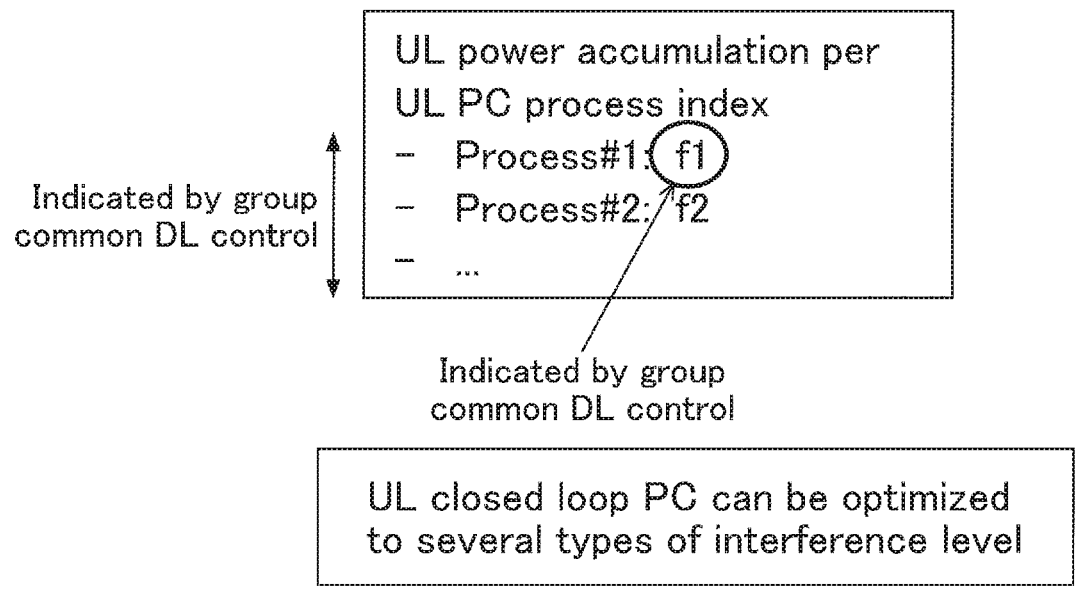
FIG. 13 is a diagram illustrating an UL power control process index notified by the Group Common system.

Further, as illustrated in FIG. 13, each process ID may be related to an UL power accumulation, and the process ID that is applied may be notified according to the Group Common scheme. In the particular example illustrated in FIG. 13, a UL power control process #1 is related to an UL power accumulation f1, and an UL power control process #2 is related to an UL power accumulation f2. For example, when the UL power control process #1 is collectively notified to the group of the user apparatus 100 according to the Group Common scheme, each user apparatus 100 sets the UL transmission power according to the UL power accumulation f1. More particularly, the UL power accumulation is performed for each process index. For example, in a case in which the user apparatus 100 receives the power offset indicator and the process index f1 by the DCI, the power is increased with respect to the corresponding UL transmission by the power offset indicated by the power offset indicator, and in a case in which the power offset indicator and the process index f1 are next received, accumulation of the power offset instructed by the power offset indicator is performed with respect to the UL transmission.

Figure 14:
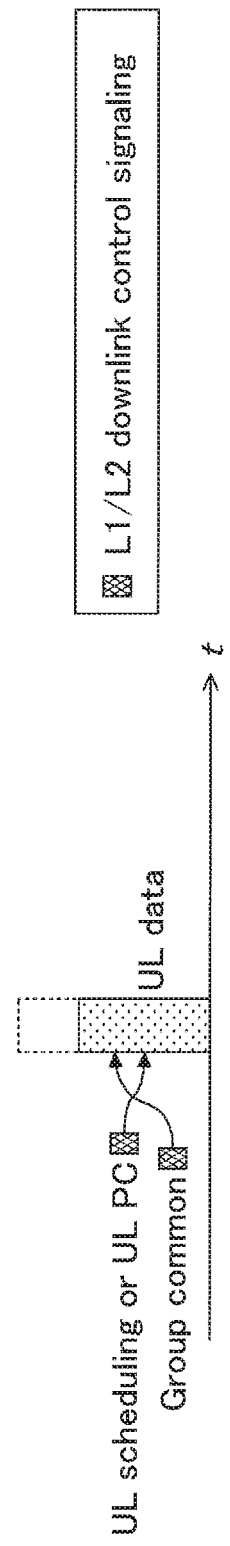
FIG. 14 is a diagram illustrating a DL control signaling of a coordinated scheme.

Next, the notification process of the power control parameters according to the combination of the UE specific scheme and the Group Common scheme, in the DCI based power control, will be described. In the scheme that is the combination of the UE specific scheme and the Group Common scheme, the parameters for the power control are notified to the user apparatus 100 by the power control parameter index, the power offset (boosting) indicator, and/or the time region pattern index of the UL power control, according to the scheme that is the combination of the UE specific scheme and the Group Common scheme. For example, as illustrated in FIG. 14, the power control parameter set index, the process ID, or the flag validating/invalidating the accumulation of the power offset may be notified to the user apparatus 100 by the L1/L2 DL control signaling according to the Group Common scheme, and the UL scheduling or the power control parameter index may be individually notified to the user apparatus 100 by the L1/L2 DL control signaling according to the UE specific scheme.

Figure 15A:
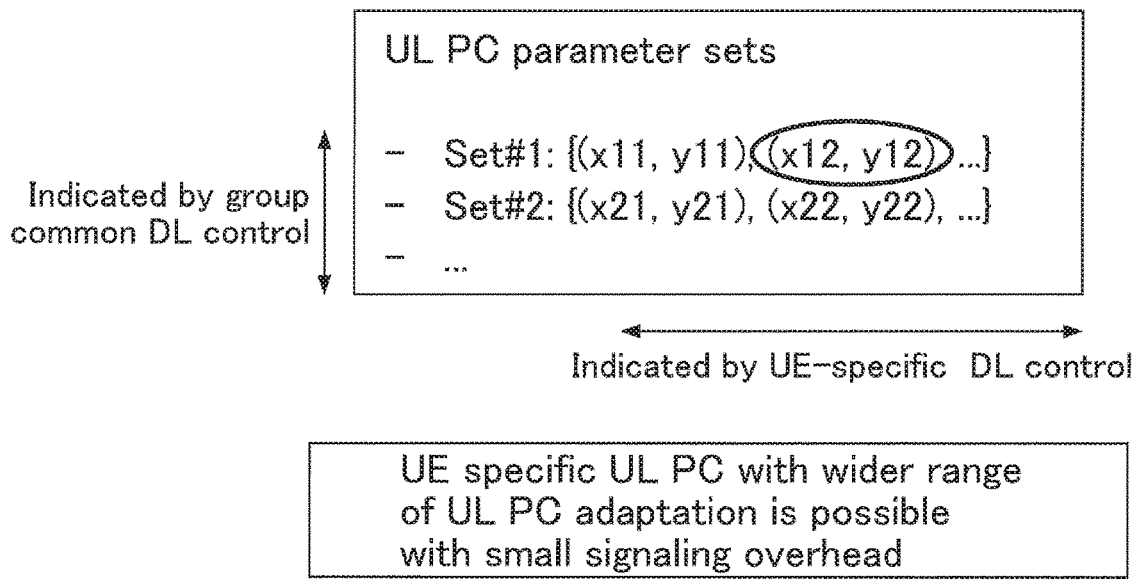
FIG. 15A is a diagram illustrating a power control parameter set index notified by the coordinated scheme.

As illustrated in FIG. 15A, in the scheme that is the combination of the UE specific scheme and the Group Common scheme, each power control parameter set may be related to the set of the plurality of power control parameters, the power control parameter set index that is applied may be notified according to the Group Common scheme, and the set of the power control parameters within the corresponding power control parameter set may be notified according to the UE specific scheme. In the particular example illustrated in FIG. 15A, when the UL power parameter set #1 is notified to the user apparatus 100 according to the Group Common scheme, and the power control parameters (x12 and y12) within the UL power parameter set #1 are notified to the user apparatus 100 according to the UE specific scheme, the user apparatus 100 sets the UL transmission power according to the power control parameters x12 and y12.

Figure 15B:
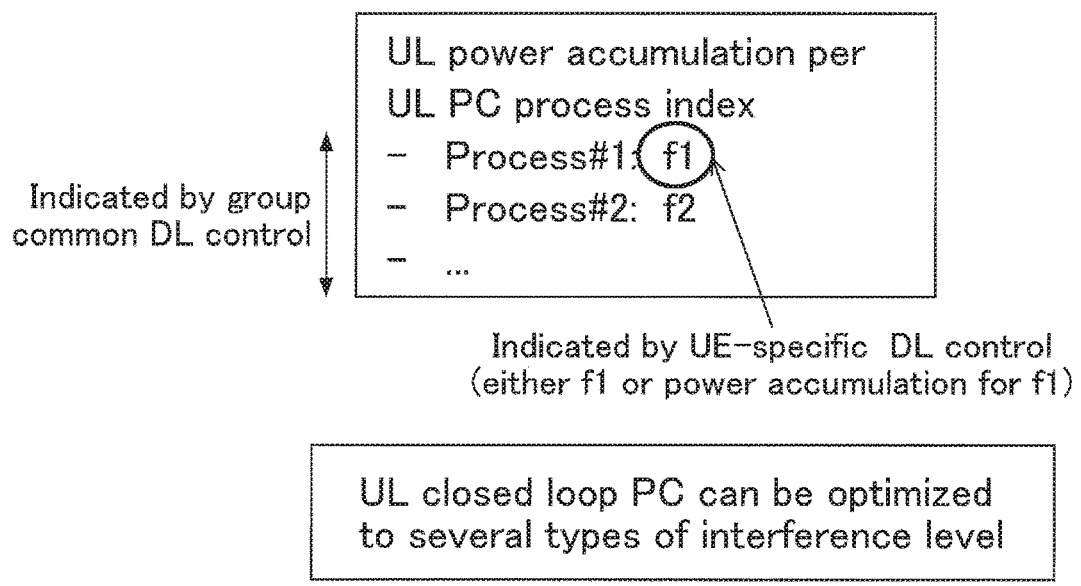
FIG. 15B is a diagram illustrating the power control parameter set index notified by the coordinated scheme.

In addition, as illustrated in FIG. 15B, each process ID may be related to the UL power accumulation, and the process ID that is applied may be notified according to the Group Common scheme, or the UL power accumulation f1 may be notified to the user apparatus 100 according to the UE specific scheme.

Figure 16A:
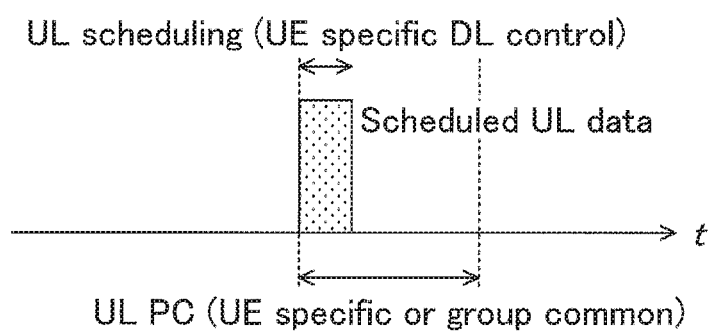
FIG. 16A is a diagram illustrating a time relationship between UL data and UL power control.
Figure 16B:
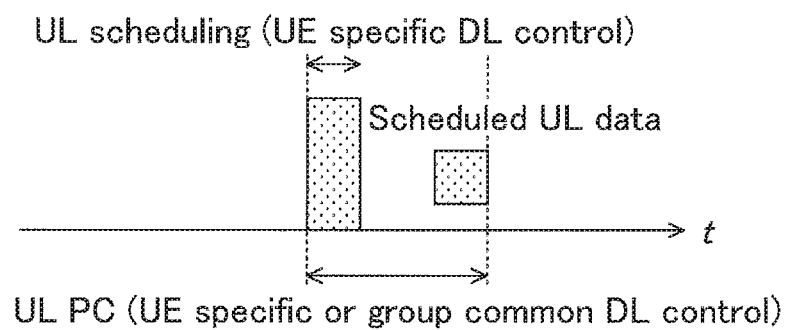
FIG. 16B is a diagram illustrating the time relationship between the UL data and the UL power control.

Further, time scales of the UL power control and the UL scheduling may be independent time scales. In other words, as illustrated in FIG. 16A and FIG. 16B, a period in which the power control parameters notified according to the UE specific scheme or the Group Common scheme are applied, may include a transmission period of the UL data scheduled by the UL scheduling notified according to the UE specific scheme. For example, the UL power control may be notified for each slot, and the UL scheduling may be scheduled to an even shorter period. Hence, the signaling overhead for the UL power control can be reduced, and effects such as reduced interference deviation in the time region, and improved accuracy of the power control of the user apparatus 100, may be expected.

The description is given above with respect to the example of the DCI based power control for the PUSCH (UL data signal) transmitted based on the UL grant (UL scheduling). With respect to the PUSCH transmitted based on the UL grant (UL scheduling), the DCI is dynamically transmitted from the base station 200 to the user apparatus 100 before the transmission of PUSCH, and thus, the user apparatus 100 can perform the UL power control by dynamically switching the power control parameters or the like by the DCI.

However, in the case of the UL signal that can be transmitted without receiving the UL grant with each transmission, such as the SRS and the Grant free PUSCH, for example, it is unclear which power control parameters are to be used. In addition, with regard to the SRS, there is a possibility that the transmission power will become inaccurate when the transmission power changes within the slot.

With regard to the Grant free PUSCH, it is conceivable, for example, to notify the parameters for the power control for each slot (or subframe) that has the possibility of transmitting the Grant free PUSCH from the base station 200 with respect to the user apparatus 100. However, in this conceivable case, the overhead will become large.

As an UL power control system capable of eliminating the above described problem, an exemplary implementation with regard to the SRS will be described as the exemplary implementation 1, and an exemplary implementation with regard to the Grant free PUSCH will be described as the exemplary implementation 2.

As preconditions in the exemplary implementations 1 and 2, it is assumed that the DCI based power control described above is performed with respect to the normal PUSCH (that is transmitted by receiving the UL grant with each transmission). However, this assumption is an example, and as the preconditions in the exemplary implementations 1 and 2, an existing power control (for example, the Non-Patent Document 1) may be performed with respect to the normal PUSCH (that is transmitted by receiving the UL grant).

Exemplary Implementation 1

As illustrated in FIG. 4, the SRS is transmitted using a part of the time resource in the slot. In the slot in which the user apparatus 100 transmits the SRS, there is a case in which the PUSCH is scheduled (PUSCH resource is allocated) with respect to the user apparatus 100, and there is a case in which the PUSCH is not scheduled with respect to the user apparatus 100. In the following, the power control of the SRS in case in which the PUSCH is scheduled with respect to the user apparatus 100 will be described as an exemplary implementation 1-1, and the power control of the SRS in the case in which the PUSCH is not scheduled with respect to the user apparatus 100 will be described as an exemplary implementation 1-2.

Exemplary Implementation 1-1

An exemplary implementation 1-1 will be described by way of exemplary implementations 1-1-1 through 1-1-5. As described above, in the exemplary implementation 1-1, the PUSCH is scheduled in the slot in which the SRS is transmitted. In the exemplary implementation 1-1-1, the user apparatus 100 determines the transmission power of the SRS in this slot based on the transmission power of the PUSCH in this slot.

For example, the user apparatus 100 uses one, or a plurality, or all of P0, α, PL, and δ used for the calculation of the transmission power of the PUSCH in the slot, also for the calculation of the transmission power of the SRS. Further, the power control parameters for the SRS set from the base station 200 by the upper layer (for example, the RRC) may be applied, for example. A formula based on the following formula 2, for example, may be used to determine the SRS transmission power in this case.

SRS transmission power=$P0\_pusch+\alpha \times PL+\delta+SP$  Formula 2

In the formula 2 above, PL denotes a pathloss of the DL measured and calculated by the user apparatus 100. This pathloss may use the pathloss used to calculate the PUSCH transmission power, or a newly measured and calculated pathloss. In addition, SP denotes a power control parameter (for example, an amount based on using band) other than P0_pusch and α.

By the power control described above, the change in the transmission power within the slot is reduced, and the transmission power of the SRS is optimized. In addition, it is possible to avoid deterioration of the accuracy of the transmission power.

In the exemplary implementation 1-1-2, the user apparatus 100 determines the transmission power of the SRS in the slot in which the PUSCH is scheduled, by a procedure that is the same as a procedure for the case in which the PUSCH is not scheduled in the slot. This procedure will be described in the description of the exemplary implementation 1-2.

According to the exemplary implementation 1-1-2, the same transmission power control is applied to the user apparatus in which the PUSCH is scheduled and the user apparatus in which the PUSCH is not scheduled. Accordingly, a dynamic range of the SRS reception power in the base station 200 can be reduced compared to the exemplary implementation 1-1-1.

In the PUSCH transmission of the URLLC aimed at realizing the wireless communication with the low delay and the high reliability, the transmission is assumed to be performed in a shorter time than the normal PUSCH, and it is assumed that a special power offset (power boosting) is applied to increase the transmission power.

For this reason, in the slot in which the PUSCH transmission of the URLLC is performed, there is a possibility that the transmission power of the SRS will become too large in the case in which the exemplary implementation 1-1-1 is applied. By taking this point into consideration, there are the exemplary implementation 1-1-3, the exemplary implementation 1-1-4, and the exemplary implementation 1-1-5 described in the following, related to the power control with respect to the SRS transmission in the slot in which the PUSCH transmission of the URLLC is performed.

In the exemplary implementation 1-1-3, the user apparatus 100 selects one of the scheme of the exemplary implementation 1-1-1 and the scheme of the exemplary implementation 1-1-2, based on the DCI received from the base station 200. For example, the user apparatus 100 selects one of the scheme of the exemplary implementation 1-1-1 and the system of the exemplary implementation 1-1-2, based on an indicator included in the DCI or a DCI format. This DCI may be a DCI for UL scheduling, or may be a DCI exclusively for selecting one of the scheme of the exemplary implementation 1-1-1 and the scheme of the exemplary implementation 1-1-2. As an example, the base station 200 transmits the DCI indicating selection of the scheme of the exemplary implementation 1-1-2 to the user apparatus 100, in a case in which the URLLC PUSCH is scheduled with respect to the user apparatus 100 in the slot in which the SRS is transmitted from the user apparatus 100. This DCI is transmitted at the head of the slot in which the SRS is transmitted from the user apparatus 100, for example. The user apparatus 100 that receives this DCI applies the scheme of the exemplary implementation 1-1-2 to transmit the SRS.

In the exemplary implementation 1-1-4, the scheme of the exemplary implementation 1-1-1 is always applied. However, the user apparatus 100 does not use the special power offset to determine the transmission power of the SRS, in a case in which the special power offset (for example, a value instructing power boosting for the URLLC) is included in the DCI (UL grant). Whether or not the DCI includes the special power offset may be identified from the DCI content (indicator) or format.

In the exemplary implementation 1-1-5, the user apparatus 100 determines the transmission power of the SRS without taking into consideration the PUSCH transmission based on the DCI, in a case in which the DCI (UL grant) for specific scheduling is received. In other words, the scheme of the exemplary implementation 1-1-2 is applied in this case. As an example, the user apparatus 100 receives the DCI for the scheduling of the PUSCH resource, from the base station 200, at the head of the slot in which the SRS is transmitted. The user apparatus 100 judges whether the scheduling by the DCI is the scheduling of the PUSCH transmission of the URLLC, based on the DCI content (indicator) or the DCI format. For example, in the case in which the scheduling by the DCI is the scheduling of the PUSCH transmission of the URLLC, the user apparatus 100 applies the scheme of the exemplary implementation 1-1-2 to transmit the SRS. In the case in which the scheduling by the DCI is not the scheduling of the PUSCH transmission of the URLLC (the case of the normal PUSCH transmission), the user apparatus 100 applies the scheme of the exemplary implementation 1-1-1 to transmit the SRS. In addition, the user apparatus 100 may apply the scheme of the exemplary implementation 1-1-2 also in a case in which the PUSCH transmission of the UL grant free is performed in a certain slot.

According to the schemes of the exemplary implementation 1-1-3 through the exemplary implementation 1-1-5 described above, it is possible to avoid an excessively large SRS transmission power caused by the URLLC transmission.

The exemplary implementation 1-1-3 through the exemplary implementation 1-1-5 are not limited to the URLLC, and is applicable to the case in which the special power offset (power boosting) is used in the PUSCH transmission.

Exemplary Implementation 1-2

Figure 17:
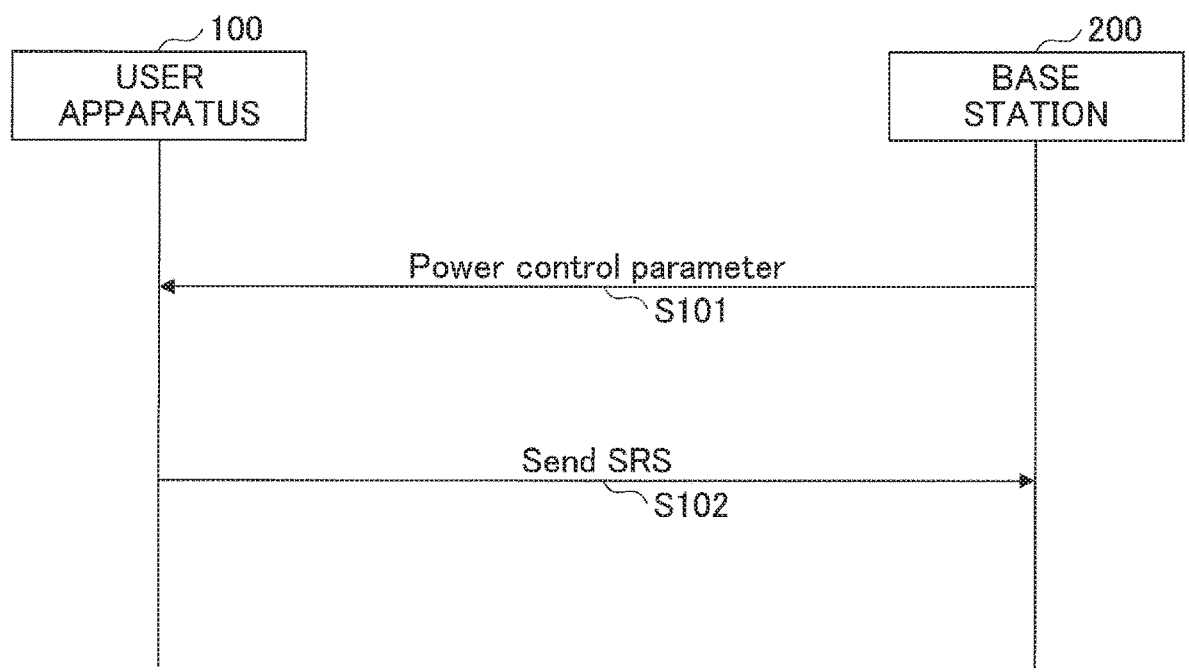
FIG. 17 is a diagram for explaining an example of a setting method for a transmission power parameter or the like of SRS.

Next, the exemplary implementation 1-2 will be described. As described above, in the exemplary implementation 1-2, the PUSCH is not scheduled in the slot in which the user apparatus 100 transmits the SRS. In the exemplary implementation 1-2, the user apparatus 100 determines the transmission power of the SRS in the slot, based on the power control parameters and/or process ID set (configured) from the upper layer. The "power control parameters and/or process ID" may be referred to as "power control parameters/process ID" in the following. In addition, the power control parameters such as P0, α, δ, or the like, and the process ID may be referred to by a generic terminology "power control parameters". In FIG. 17, an indication "power control parameters" is intended to have the meaning of this generic terminology. Further, the power control parameters such as P0, α, δ, or the like, the process ID, and the parameters for determining the pathloss estimation value may be referred to by the generic terminology "power control parameters".

FIG. 17 illustrates an example of a sequence illustrating a basic process of the exemplary implementation 1-2. In step S101, the base station 200 transmits the power control parameters/process ID to the user apparatus 100. This transmission may be performed by the UE specific RRC signaling, or the broadcast signaling (for example, SIB), or the Group Common PDCCH.

In step S102, the user apparatus UE determines the transmission power of the SRS using the power control parameters/process ID received in step S101, and transmits the SRS with the determined transmission power.

The signaling in step S101 may be the signaling of the power control parameters/process ID of a candidate for use in the power control of the PUSCH by the DCI based power control.

More particular examples of the scheme will be described as an exemplary implementation 1-2-1 and an exemplary implementation 1-2-2 (exemplary implementation 1-2-2A and exemplary implementation 1-2-2B).

In the exemplary implementation 1-2-1, one power control parameter/process ID is notified from the base station 200 to the user apparatus 100. In this case, one power control parameter/process ID is intended to mean one option, and for example, "one power control parameter" may include a plurality of parameters used to calculate the transmission power.

In the exemplary implementation 1-2-1, the user apparatus 100 applies one power control parameter/process ID that is configured, to determine the transmission power of the SRS, and transmits the SRS using the determined transmission power. In the exemplary implementation 1-2-1, there is only one option of the power control parameter/process ID, and thus, the user apparatus 100 can perform a transmission power determination with a high reliability.

The user apparatus 100 can use the configured parameters, and use a formula based on the following formula 3, for example.

$$\text{SRS transmission power} = P0\_srs + \alpha \times PL + SP \qquad \text{Formula 3}$$

In the formula 3 above, P0_srs and α respectively denote parameters for SRS. PL denotes a pathloss of the DL measured and calculated by the user apparatus 100. In addition, SP denotes a power control parameter other than P0_srs and α.

In the exemplary implementation 1-2-1, there is only one option of the parameter, however, the user apparatus 100 determines the transmission power of the SRS using the pathloss estimated based on the reception power of the reference signal. Consequently, although the determined transmission power may not be the optimum transmission power, it is possible to determine an appropriate transmission power.

In the exemplary implementation 1-2-2, a plurality of power control parameters/process IDs are notified from the base station 200 with respect to the user apparatus 100. This notification may be performed by UE specific RRC signaling (upper layer signaling), or broadcast signaling (for example, SIB), or Group Common PDCCH.

In this case, the plurality of power control parameters/process IDs refer to a plurality of candidates of the power control parameter/process ID to be used, and is intended to mean a plurality of options. The user apparatus 100 selects one power control parameter/process ID from the plurality of power control parameters/process IDs, and uses the selected power control parameter/process ID to determine the transmission power of the SRS using the formula based on the formula 3, for example, and transmits the SRS using the determined transmission power. More particularly, there are the following exemplary implementation 1-2-2A and exemplary implementation 1-2-2B. When notifying the plurality of power control parameters/process IDs, a set of each index and a value of a corresponding parameter, for example, are notified similarly to the notification in the "DCI based power control".

Further, the plurality of power control parameters/process IDs are the power control parameters/process IDs for each beam usable for the reception of the SRS by the base station 200 and/or for each signal waveform usable for the reception of the SRS by the base station 200, for example.

In the exemplary implementation 1-2-2A, the user apparatus 100 selects one power control parameter/process ID from the plurality of power control parameters/process IDs, based on an instruction by the signaling from the base station 200. The signaling from the base station 200 is the upper layer signaling (for example, UE specific RRC signaling, or broadcast (for example, SIB)), or the DCI (for example, DCI of Group Common PDCCH, or UE specific DCI). The DCI may be the DCI received in the slot in which the SRS is transmitted, or the DCI received in a slot time-wise preceding the slot in which the SRS is transmitted.

According to the exemplary implementation 1-2-2A, the base station 200 can notify one optimum power control parameter/process ID to the user apparatus 100, based on the reception beam forming, for example, and the user apparatus 100 can set the optimum SRS transmission power.

In the exemplary implementation 1-2-2A, if the user apparatus 100 cannot detect the control information for selecting one power control parameter/process ID in the slot in which the SRS is transmitted, the user apparatus 100 does not transmit the SRS in this slot (prohibits transmission), for example. In addition, in the exemplary implementation 1-2-2A, if the user apparatus 100 cannot detect the control information for selecting one power control parameter/process ID in the slot in which the SRS is transmitted, the user apparatus 100 may select a fallback power control parameter/process ID that is set from the upper layer (from the base station 200), for example. The fallback power control parameter/process ID may be the power control parameter/process ID that maximizes the transmission power of the SRS among the plurality of selectable power control parameters/process IDs.

Next, the exemplary implementation 1-2-2B will be described. In the exemplary implementation 1-2-2B, the user apparatus 100 autonomously selects one power control parameter/process ID from the plurality of power control parameters/process IDs. More particularly, the power control parameter/process ID that maximizes the transmission power of the SRS is selected from the plurality of selectable power control parameters/process IDs, for example. According to the exemplary implementation 1-2-2B, the transmission power can be determined with a high reliability. In addition, it may be expected that a sufficient transmission power can be obtained with respect to the transmission of the SRS.

Regarding Pathloss Estimation (Exemplary Implementation 1

Next, a pathloss estimation performed by the user apparatus 100 in the exemplary implementation 1 will be described.

For example, the user apparatus 100 can calculate a pathloss of each subframe (or each slot) of a serving cell, by "referenceSignalpower−higher layer filtered RSRP". The referenceSignalpower is a parameter notified by the RRC signaling (for example, Non-Patent Document 2), and indicates the transmission power of the reference signal of the DL. The higher layer filtered RSRP is a RSRP that is filtered by a method prescribed in the Non-Patent Document 2, for example. For example, the filtering uses a parameter for filtering (for example, filterCoefficient).

In addition to the above, the parameters related to the pathloss, used for the transmission power determination of the SRS in the exemplary implementation 1, include a parameter that specifies which one of a plurality of reference signals is to be used for the measurement of the RSRP, for example. For example, each of the plurality of reference signals is made to correspond to a certain beam.

The set of the above described parameters related to the pathloss may be notified as a SRS power configuration, for example, from the base station 200 to the user apparatus 100, by broadcast signaling, or UE specific RRC signaling (upper layer signaling). The user apparatus 100 calculates an estimation value of the pathloss for the transmission power calculation of the SRS using the notified parameters.

In addition, a plurality of candidates (each added with an index) of the set of the parameters related to the pathloss may be notified from the base station 200 to the user apparatus, by the broadcast signaling, or the UE specific RRC signaling (upper layer signaling). In this case, the set of the parameters actually used by the user apparatus 100 are instructed from the base station 200 to the user apparatus 100 by the broadcast signaling, or the UE specific RRC signaling, or the DCI (for example, Group Common PDCCH, or UE specific PDCCH). Moreover, the user apparatus 100 may autonomously select one set of the parameters from the plurality of candidates of the parameters related to the pathloss.

Further, the user apparatus UE may use a pathloss estimated for the power control of the PUSCH in a slot that is the same as the SRS transmission slot, as the pathloss for the power control of the SRS. In addition, the user apparatus 100 may use the set of the parameters for estimating the pathloss, used for the power control of the PUSCH in a slot that is the same as the SRS transmission slot, as the set of the parameters for estimating the pathloss for the power control of the SRS Other Examples The user apparatus 100 may determine the transmission power of the SRS using the transmission power of the last scheduled PUSCH before the transmission of the SRS and/or the power control parameter of the last scheduled PUSCH before the transmission of the SRS and/or the pathloss estimation value of the last scheduled PUSCH before the transmission of the SRS.

In addition, in the exemplary implementation 1, the power control parameter/process ID of the SRS may be used in common as the power control parameter/process ID used for the power control of the PUSCH. For example, a part (subset) of the plurality of power control parameters/process IDs notified from the base station 200 to the user apparatus 100 by the upper layer signaling or the broadcast signaling, described above under the "DCI based power control", may be set for the power control of the SRS.

In the exemplary implementation 1, the Grant free PUSCH transmission, in the SRS power control, may be regarded as a scheduled PUSCH transmission (based on UL grant). For example, in a case in which the user apparatus 100, in the exemplary implementation 1-1-1, transmits the SRS in a certain slot and transmits the Grant free PUSCH in this certain slot, the transmission power of the SRS can be determined based on the transmission power of the Grant free PUSCH.

Each of the schemes described above (exemplary implementations 1-1-1, 1-1-2, 1-1-3, 1-1-4, 1-1-5, 1-2-1, 1-2-2A, 1-2-2B, or the like) may be switched based on the upper layer signaling. In addition, each of the schemes described above may be switched with another scheme based on the upper layer signaling.

For example, the SRS transmission power for UL sounding and the SRS transmission power for crosslink interference measurement may be determined to be different, based on the upper layer signaling. However, in a case in which the SRS transmission power for UL sounding and the SRS transmission power for crosslink interference measurement are set to the user apparatus 100 without distinction between the two, the distinction of the transmission power based on the above usage may be unnecessary.

Exemplary Implementation 2

Figure 18:
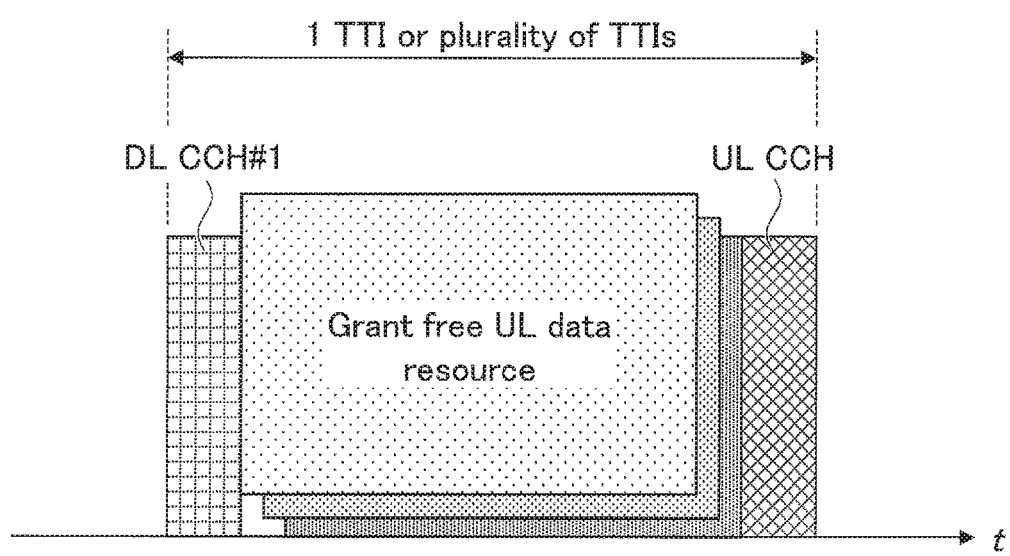
FIG. 18 is a diagram illustrating an example of a Grant free UL resource.

Next, the exemplary implementation 2 will be described. An example of the power control will be described for the Grant free PUSCH. The Grant free PUSCH transmission in this case includes SPS capable of performing transmission without receiving the UL grant for each transmission, RACH-less UL transmission (UL transmission performed when the user apparatus 100 is in an idle state), or the like FIG. 18 illustrates an example of a wireless frame structure for a case in which a Grant free UL data resource region is set. The user apparatus 100 transmits the PUSCH (data signal) using the resource within the Grant free UL data resource region. As illustrated in FIG. 18, in this example, a DL CCH (Downlink Control Channel) #1 which is a downlink control channel, and an UL CCH (Uplink Control Channel) which is an uplink control channel are set, and a Grant free UL data resource region (rectangle labeled Gant free UL data resource in FIG. 18) is set (configured) between these two control channels. FIG. 18 illustrates the Grant free UL data resource region allocated to a plurality of users, however, it is not a precondition to allocate overlapping resources to the plurality of users, and an orthogonal resource allocation may be performed.

Each Grant free UL data resource region set to the user apparatus 100 may be referred to as a resource pool. In this case, the user apparatus 100 set with the resource pool can perform the data transmission by PUSCH, by selecting, from the resource pool, the Grant free UL data resource for the data transmission. As may be seen from the viewpoint that the Grant free UL data resource region can be formed by the resource pool, the Grant free UL data resource region may be a Sidelink resource pool, and in this case, the user apparatus 100 can perform a Sidelink transmission using this resource.

The DL CCH #1, the UL CCH, and the Grant free UL data resource region are set from the base station 200 to the user apparatus 100 by the upper layer signaling (for example, UE specific RRC signaling) or the broadcast signaling, for example.

The structure illustrated in FIG. 18 is an example, and for example, it is possible to use a structure including the Grant free UL data resource region and the UL CCH and no DL CCH #1, or a structure including the DL CCH #1 and the Grant free UL data resource region and no UL CCH, or a structure including only the Grant free UL data resource region and no DL CCH #1 nor UL CCH.

Figure 19:
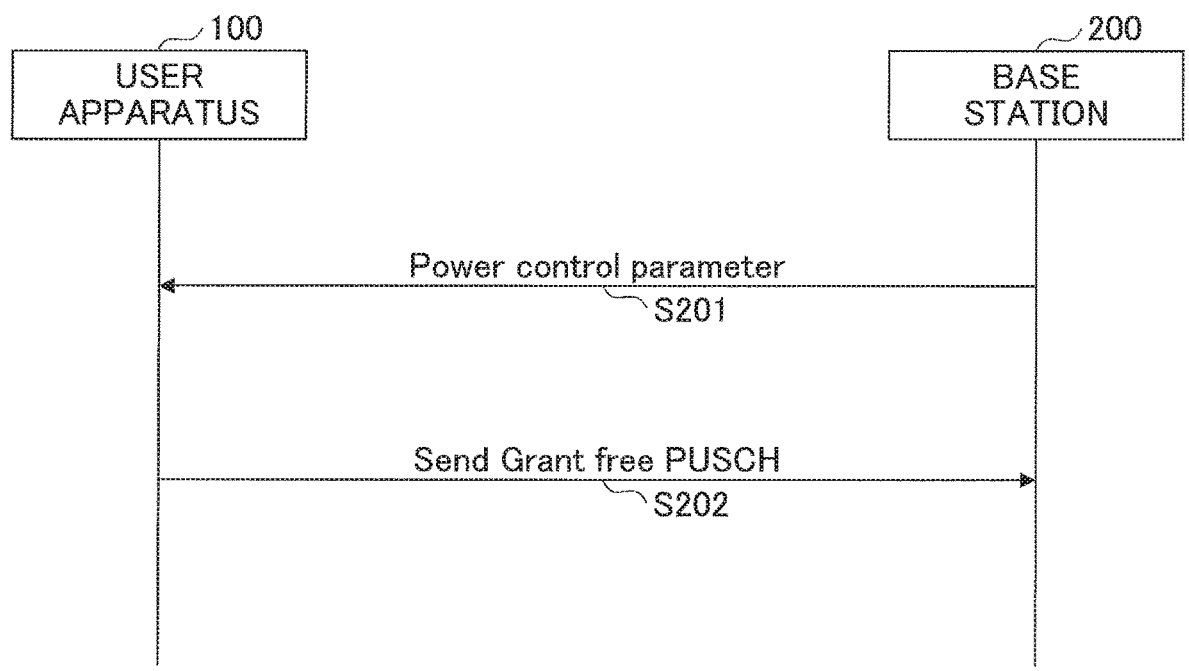
FIG. 19 is a diagram for explaining an example of a setting method for a transmission power parameter or the like of Grant free PUSCH.

In the exemplary implementation 2, the user apparatus 100 determines the transmission power of the Grant free PUSCH in a certain slot, based on the power control parameter and/or process ID set (configured) from the upper layer. The "power control parameter and/or process ID" may be referred to as "power control parameter/process ID" in the following. In addition, the power control parameters such as P0, α, δ, or the like, and the process ID may be referred to by the generic terminology "power control parameters". In FIG. 19, an indication "power control parameters" is intended to have the meaning of this generic terminology. Further, the power control parameters such as P0, α, δ, or the like, the process ID, and the parameters for determining the pathloss estimation value may be referred to by the generic terminology "power control parameters".

FIG. 19 illustrates an example of a sequence illustrating a basic process of the exemplary implementation 2. As illustrated in FIG. 19, in step S201, the base station 200 transmits the power control parameters/process ID with respect to the user apparatus 100. This transmission may be performed by the UE specific RRC signaling, or the broadcast signaling (for example, SIB), or the Group Common PDCCH.

In step S202, the user apparatus UE determines the transmission power of the Grant free PUSCH using the power control parameters/process ID received in step S201, and transmits the Grant free PUSCH with the determined transmission power. The signaling in step S201 may be the signaling of the power control parameters/process ID of a candidate for use in the power control of the PUSCH by the DCI based power control.

More particular examples of the scheme will be described in the following as an exemplary implementation 2-1, an exemplary implementation 2-2, and an exemplary implementation 2-3.

In the exemplary implementation 2-1, one PUSCH power control parameter/process ID (reference PUSCH power control parameter) is notified from the base station 200 to the user apparatus 100. In this case, one PUSCH power control parameter/process ID is intended to mean one option, and for example, "the PUSCH power control parameter" may include a plurality of parameters used to calculate the transmission power. The notification from the base station 200 to the user apparatus 100 may be the UE specific signaling (for example, UE specific RRC signaling), or intra-cell common signaling (for example, broadcast), or Group Common signaling (for example, Group Common PDCCH).

The user apparatus 100 can use the configured parameters, and use a formula similar to the formula 1, for example, to determine the transmission power of the Grant free PUSCH. However, when determining the transmission power of the Grant free PUSCH, δ does not need to be included.

In the exemplary implementation 2-2, one PUSCH power control parameter/process ID (reference PUSCH power control parameter) is notified from the base station 200 to the user apparatus for each resource pool. In this case, one PUSCH power control parameter/process ID is intended to mean one option, and for example, "the PUSCH power control parameter" may include a plurality of parameters used to calculate the transmission power. The notification from the base station 200 to the user apparatus 100 may be the UE specific signaling (for example, UE specific RRC signaling), or intra-cell common signaling (for example, broadcast), or Group Common signaling (for example, Group Common PDCCH). However, in a case in which the setting of the resource pool is performed by the Group Common PDCCH, for example, the PUSCH power control parameter/process ID may be set by the Group Common PDCCH that sets the resource pool, or another Group Common PDCCH.

The user apparatus 100 uses the parameters set with respect to the resource pool used for the Grant free PUSCH, to determine the transmission power of the Grant free PUSCH, and transmits the Grant free PUSCH using the determined transmission power.

In the exemplary implementation 2-3, a plurality of PUSCH power control parameters/process IDs are notified from the base station 200 to the user apparatus 100, for each resource pool, for example. In this case, the plurality of PUSCH power control parameters/process IDs is intended to mean a plurality of options. The user apparatus 100 selects one PUSCH power control parameter/process ID from the plurality of PUSCH power control parameters/process IDs corresponding to the resource pools used for the Grant free PUSCH transmission, and uses the selected PUSCH power control parameter/process ID to determine the transmission power of the Grant free PUSCH using the formula based on the formula 1, for example, and transmits the Grant free PUSCH using the determined transmission power. More particularly, there are the following exemplary implementation 2-3A and exemplary implementation 2-3B. When notifying the plurality of power control parameters/process IDs, a set of each index and a value of a corresponding parameter, for example, are notified similarly to the notification in the "DCI based power control".

Further, the plurality of power control parameters/process IDs are the power control parameters/process IDs for each beam usable for the reception of the Grant free PUSCH by the base station 200 and/or for each signal waveform usable for the reception of the Grant free PUSCH by the base station 200, for example.

In the exemplary implementation 2-3A, the user apparatus 100 selects one power control parameter/process ID from the plurality of power control parameters/process IDs, based on an instruction by the signaling from the base station 200. The signaling from the base station 200 is the upper layer signaling (for example, UE specific RRC signaling, or broadcast (for example, SIB)), or the DCI (for example, DCI of Group Common PDCCH, or UE specific DCI). The DCI may be the DCI received in the slot in which the Grant free PUSCH is transmitted, or the DCI received in a slot timewise preceding the slot in which the Grant free PUSCH is transmitted.

According to the exemplary implementation 2-3A, the base station 200 can notify one optimum power control parameter/process ID to the user apparatus 100, based on the reception beam forming, for example, and the user apparatus 100 can set the optimum PUSCH transmission power.

In the exemplary implementation 2-3A, if the user apparatus 100 cannot detect the control information for selecting one power control parameter/process ID in the slot in which the Grant free PUSCH is transmitted, the user apparatus 100 does not transmit the Grant free PUSCH in this slot (prohibits transmission), for example. In addition, in the exemplary implementation 2-3A, if the user apparatus 100 cannot detect the control information for selecting one power control parameter/process ID in the slot in which the Grant free PUSCH is transmitted, the user apparatus 100 may select a fallback power control parameter/process ID that is set from the upper layer, for example. The fallback power control parameter/process ID may be the power control parameter/process ID that maximizes the transmission power of the Grant free PUSCH among the plurality of selectable power control parameters/process IDs.

Next, the exemplary implementation 2-3B will be described. In the exemplary implementation 2-3B, the user apparatus 100 autonomously selects one power control parameter/process ID from the plurality of power control parameters/process IDs. More particularly, the power control parameter/process ID that maximizes the transmission power of the Grant free PUSCH is selected from the plurality of selectable power control parameters/process IDs, for example. According to the exemplary implementation 2-3B, the transmission power can be determined with a high reliability. In addition, it may be expected that a sufficient transmission power can be obtained with respect to the transmission of the Grant free PUSCH.

Other Examples

In the exemplary implementation 2, similarly to the example described in conjunction with FIG. 9A and FIG. 9B, the PUSCH power control parameter/process ID may be set from the base station 200 to the user apparatus 100 for each time resource and/or frequency resource. As an example, different PUSCH power control parameters/process IDs may be set in different slots.

In addition, in a case in which the user apparatus 100 cannot output the transmission power calculated from the PUSCH power control parameters set with respect to a certain resource due to capability limitations of the transmission power, for example, the user apparatus 100 may perform no Grant free PUSCH transmission at this certain resource.

Further, the user apparatus 100 may determine the transmission power of the Grant free PUSCH using the transmission power of the last scheduled PUSCH before the transmission of the Grant free PUSCH and/or the power control parameter of the last scheduled PUSCH before the transmission of the Grant free PUSCH and/or the pathloss estimation value of the last scheduled PUSCH before the transmission of the Grant free PUSCH.

Regarding Pathloss Estimation (Exemplary Implementation 2

Next, a pathloss estimation performed by the user apparatus 100 in the exemplary implementation 2 will be described.

For example, as described above, the user apparatus 100 can calculate a pathloss of each subframe (or each slot) of a serving cell, by "referenceSignalpower–higher layer filtered RSRP". The referenceSignalpower is a parameter notified by the RRC signaling (for example, Non-Patent Document 2), and indicates the transmission power of the reference signal of the DL. The higher layer filtered RSRP is a RSRP that is filtered by a method prescribed in the Non-Patent Document 2, for example. For example, the filtering uses a parameter for filtering (for example, filterCoefficient).

In addition to the above, the parameters related to the pathloss, used for the transmission power determination of the Grant free PUSCH in the exemplary implementation 2, include a parameter that specifies which one of a plurality of reference signals is to be used for the measurement of the RSRP, for example. For example, each of the plurality of reference signals is made to correspond to a certain beam.

The set of the above described parameters related to the pathloss may be notified as a part of a power configuration of the PUSCH, for example, from the base station 200 to the user apparatus 100, by broadcast signaling, or UE specific RRC signaling (upper layer signaling). The user apparatus 100 calculates an estimation value of the pathloss for the transmission power calculation of the Grant free PUSCH using the notified parameters.

In addition, the set of the parameters related to the pathloss, used for the transmission power determination of the Grant free PUSCH in the exemplary implementation 2, may be notified as a part of a resource configuration of the Grant free PUSCH, for example, from the base station 200 to the user apparatus 100, by RRC signaling (upper layer signaling).

In addition, a plurality of candidates (each added with an index) of the set of the parameters related to the pathloss may be notified from the base station 200 to the user apparatus, by by the broadcast signaling, or the UE specific RRC signaling (upper layer signaling). In this case, the set of the parameters actually used by the user apparatus 100 are instructed from the base station 200 to the user apparatus 100 by the broadcast signaling, or the UE specific RRC signaling, or the DCI (for example, Group Common PDCCH, or UE specific PDCCH). Moreover, the user apparatus 100 may autonomously select one set of the parameters from the plurality of candidates of the parameters related to the pathloss.

As described above, according to the exemplary implementation 2, a mechanism is provided for performing the UL transmission power determination for the Grant free PUSCH.

Structure of Apparatus

A description will be given of examples of functional structures of the user apparatus 100 and the base station 200 for performing the operation of the above described embodiments. Each of the user apparatus 100 and the base station 200 includes all of the functions of the embodiments described above. However, each of the user apparatus 100 and the base station 200 may include a part of all of the functions of the embodiments described above. For example, each of the user apparatus 100 and the base station 200 may include one of, or a plurality of, or all of the functions among the functions for performing the operation of the exemplary implementation 1, and the functions for performing the operation of the exemplary implementation 2.

User Apparatus 100

FIG. 20 is a diagram illustrating an example of the functional structure of the user apparatus 100. As illustrated in FIG. 20, the user apparatus 100 includes a signal transmission part 101, a signal reception part 102, a configuration information management part 103, and a transmission power determination part 104. The functional structure illustrated in FIG. 20 is merely one example. Functional groupings and names of functional parts may be set arbitrarily, as long as the operation of the above described embodiments can be performed.

The signal transmission part 101 is configured to generate signals of the lower layer from information of the upper layer, and transmit the generated signals by wireless transmission. The signal reception part 102 is configured to receive various kinds of signals by wireless reception, and acquire the information of the upper layer from the received signals.

The configuration information management part 103 includes a storage part for storing configuration information that is preconfigured, and configuration information dynamically and/or semi-statically transmitted from the base station 200 or the like.

The transmission power determination part 104 is configured to perform the transmission power determination process of this embodiment described above (DL base power control, exemplary implementation 1, exemplary implementation 2).

For example, the signal reception part 102 is configured to receive, from the base station 200, the plurality of power control parameters that become candidates of the power control parameter used by the user apparatus 100. The transmission power determination part 104 is configured to select the power control parameter to be used, from the plurality of power control parameters, and determine the transmission power of an UL signal, based on the selected power control parameter and the pathloss estimation value. The signal transmission part 101 is configured to transmit the UL signal using the transmission power determined by the transmission power determination part 104.

The UL signal is a reference signal or a data signal transmitted using a resource of the UL Grant free. The transmission power determination part 104 may be configured to select the power control parameter that maximizes the transmission power of the UL signal, from the plurality of power control parameters. The signal reception part 102 may be configured to receive, from the base station, the plurality of parameters that become candidates of the parameter to be used to determine the pathloss estimation value. The transmission power determination part 104 may be configured to select the parameter to be used, from the plurality of parameters, and determine the pathloss estimation value using the selected parameter.

The resource of the UL Grant free refers to the resource for the UL transmission not requiring the UL grant from the base station for each UL transmission. With regard to the resource of the UL Grant free, it is possible to use a method of selecting, by the user apparatus, the actual transmission resource from the transmission resource candidates set in advance from the upper layer (for example, by broadcast signaling and/or RRC signaling), or to use a method notifying the transmission resource by the DCI or the like from the base station using SPS (Semi-Persistent Scheduling). When performing the UL transmission, the user apparatus does not need to be in a connected state (for example, RRC_CONNECTED).

Base Station 200

FIG. 21 is a diagram illustrating an example of the functional structure of the base station 200. As illustrated in FIG. 21, the base station 200 includes a signal transmission part 201, a signal reception part 202, a configuration information management part 203, and a transmission power control part 204. The functional structure illustrated in FIG. 21 is merely one example. Functional groupings and names of functional parts may be set arbitrarily, as long as the operation of the above described embodiments can be performed.

The signal transmission part 201 is configured to generate signals of the lower layer from information of the upper layer, and transmit the generated signals by wireless transmission. The signal reception part 202 is configured to receive various kinds of signals by wireless reception, and acquire the information of the upper layer from the received signals. The configuration information management part 203 includes a storage part, and includes functions to store configuration information that is preconfigured, and to determine and store set information dynamically and/or semi-statically set with respect to the user apparatus 100. In addition, the transmission power control part 204 is configured to determine parameters for determining the transmission power of the UL signal at the user apparatus 100, and includes a function to transmit the parameters to the user apparatus 100 via the signal transmission part 201.

Hardware Structure

Block diagrams (FIG. 20 and FIG. 21) used to describe the above described embodiments illustrate the blocks in functional units. These functional blocks (functional parts) may be realized by arbitrary combinations of hardware and/or software. In addition, means for realizing each functional block is not limited to a particular means. In other words, each functional block may be realized by a single device that physically and/or logically integrates a plurality of elements, or by a plurality of devices by connecting two or more physically and/or logically separated devices directly and/or indirectly (for example, by cable and/or wireless).

Figure 22:
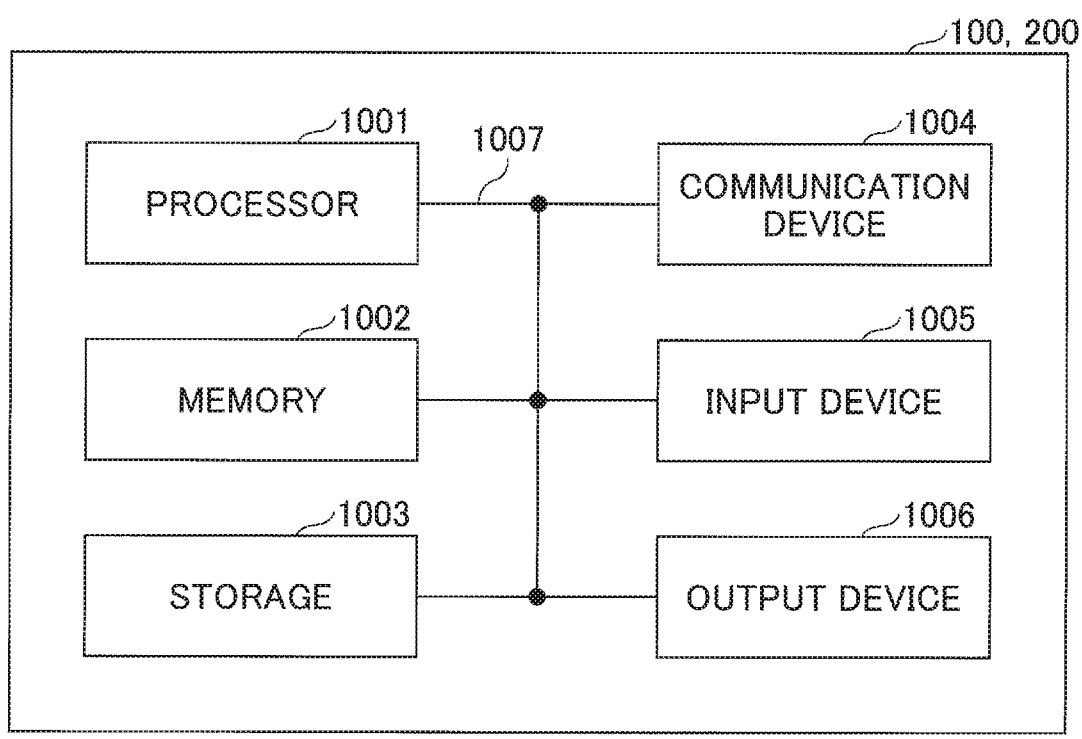
FIG. 22 is a diagram illustrating an example of hardware structure of the user apparatus 100 and the base station 200.

For example, each of the user apparatus 100 and the base station 200 in one embodiment of the present invention may function as a computer that performs the processes according to the embodiment. FIG. 22 is a diagram illustrating an example of a hardware structure of the user apparatus 100 and the base station 200 in one embodiment. The user apparatus 100 and the base station 200 may each be formed as a computer physically including a processor 1001, a memory 1002, a storage 1003, a communication device 1004, an input device 1005, an output device 1006, a bus 1007, or the like.

In the following description, the terminology "apparatus" may be replaced by a circuit, a device, a unit, or the like. The hardware structure of the user apparatus 100 and the base station 200 may be formed to include one or a plurality of each of the devices 1001 through 1006 illustrated in FIG. 15, or may be formed not to include a part of the devices.

Each function of the user apparatus 100 and the base station 200 may be realized by reading predetermined software (program) into the hardware such as the processor 1001 and the memory 1002, performing computations by the processor 1001, and controlling communication by the communication device 1004 and/or write and/or read of data to and/or from the memory 1002 and the storage 1003.

The processor 1001 controls the entire computer by operating an operating system, for example. The processor 1001 may be formed by a CPU (Central Processing Unit) including an interface with respect to a peripheral device, a control device, a computation device, a register, or the like.

In addition, the processor 1001 reads a program (program code), software module, or data from the storage 1003 and/or from the communication device 1004 to the memory 1002, and executes various processes according to the read program, software module, or data. The program may be a program for causing the computer to execute at least a part of the operation of the embodiments described above. For example, the transmission part 101, the reception part 102, the set information management part 103, and the transmission power determination part 104 of the user apparatus 100 illustrated in FIG. 20, may be realized by a control program that is stored in the memory 1002 and runs in the processor 1001. In addition, for example, the transmission part 201, the reception part 202, the set information management part 203, and the transmission power control part 204 of the base station 200 illustrated in FIG. 21, may be realized by a control program that is stored in the memory 1002 and runs in the processor 1001. Each of the various processes described above are described as being executed by the single processor 1001, however, each of the various processes may be simultaneously or successively executed by two or more processors 1001. The processor 1001 may be implemented in one or more chips. The program may be transmitted from a network through telecommunication lines.

The memory 1002 is a computer-readable recording medium, and may be formed by at least one of a ROM (Read Only Memory), an EPROM (Erasable Programmable ROM), EEPROM (Electrically Erasable Programmable ROM), a RAM (Random Access Memory), or the like. The memory 1002 may be referred to as a register, a cache, a main memory (main storage device), or the like. The memory 1002 may store the program (program code), the software module, or the like that are executable to perform the processes in one embodiment of the present invention.

The storage 1003 is a computer-readable recording medium, and may be formed by at least one of an optical disc such as a CD-ROM (Compact Disc ROM) or the like, a hard disc drive, a flexible disc, a magneto-optical disc (for example, a compact disc, a digital versatile disc, Blu-ray (registered trademark) disc), a smart card, a flash memory (for example, a card, a stick, and a key drive), a floppy (registered trademark) disc, a magnetic strip, or the like. The storage 1003 may be referred to as an auxiliary storage device. The recording medium described above may be a database, a server, and other appropriate media including the memory 1002 and/or the storage 1003.

The communication device 1004 is hardware (transmission and reception device) for performing communication between computers via the cable and/or wireless network. The communication device 1004 may be referred to as a network device, a network controller, a network card, a communication module, or the like. For example, the signal transmission part 101 and the signal reception part 102 of the user apparatus 100 may be realized by the communication device 1004. In addition, the signal transmission part 201 and the signal reception part 202 of the base station 200 may be realized by the communication device 1004.

The input device 1005 is an input device (for example, a keyboard, a mouse, a microphone, a switch, a button, a sensor, or the like) that receives an external input. The output device 1006 is an output device (for example, a display, a speaker, a LED lamp, or the like) that makes an output to an outside. The input device 1005 and the output device 1006 may have an integral structure (for example, a touchscreen panel).

Each device such as the processor 1001 and the memory 1002 is connected to the bus 1007 to communicate information. The bus 1007 may be formed by a single bus, or by buses that are different among the devices.

Each of the user apparatus 100 and the base station 200 may be formed by hardware including a microprocessor, a DSP (Digital Signal Processor), an ASIC (Application Specific Integrated Circuit), a PLD (Programmable Logic Device), a FPGA (Field Programmable Gate Array), or the like. A part or all of the functional blocks may be realized by such hardware. For example, the processor 1001 may be implemented in at least one such hardware.

Summary of Embodiments

As described heretofore, this embodiment can provide a user apparatus in a wireless communication system including a base station and a user apparatus, characterized in that there are provided a signal reception part that receives, from the base station, a plurality of power control parameters that become candidates for power control parameters to be used by the user apparatus, a transmission power determination part that selects power control parameters to be used, from the plurality of power control parameters, and determines a transmission power of a UL signal, based on the selected power control parameters and a pathloss estimation value, and a signal transmission part that transmits the UL signal using the transmission power determined by the transmission power determination part.

According to the above structure, it is possible to provide an UL power control technique with respect to the UL signal that is transmitted without receiving the UL grant.

For example, the UL signal may be a reference signal or a data signal transmitted using a resource for UL transmission requiring no UL grant from the base station for each uplink transmission. According to this structure, it is possible to appropriately perform the UL power control with respect to the data signal that is transmitted using the resource of the reference signal or the UL grant free.

The transmission power determination part may select, from the plurality of power control parameters, power control parameters that maximize a transmission power of the UL signal. According to this structure, it is possible to accurately perform the transmission power determination, and secure sufficient transmission power.

The transmission power determination part may select, from the plurality of power control parameters, power control parameters to be used, based on down control information received by the signal reception part. According to this structure, an optimum UL transmission power can be used, because the it is possible to use the power control parameters determined by the base station.

The signal reception part may receive, from the base station, a plurality of parameters that become candidates for parameters to be used to determine the pathloss estimation value, and the transmission power determination part may select the parameters to be used from the plurality of parameters, and determine the pathloss estimation value using the selected parameters. According to this structure, it is possible to calculate the pathloss using the appropriate parameters.

In addition, this embodiment can provide a transmission power control method performed by a user apparatus in a wireless communication system including a base station and the user apparatus, characterized in that there are provided a signal reception step that receives, from the base station, a plurality of power control parameters that become candidates for power control parameters to be used by the user apparatus, a transmission power determination step that selects power control parameters to be used, from the plurality of power control parameters, and determines a transmission power of a UL signal, based on the selected power control parameters and a pathloss estimation value, and a signal transmission step that transmits the UL signal using the transmission power determined by the transmission power determination step.

According to the above structure, it is possible to provide a UL power control technique with respect to the UL signal that is transmitted without receiving the UL grant.

Supplements to Embodiments

The embodiments of the present invention have been described above, but the disclosed invention is not limited to these embodiments. Those skilled in the art may understand various modifications, corrections, substitutions, replacements, or the like that are possible. To promote understanding of the invention, the description has been made using specific numerical examples. These numerical values are merely examples, and any appropriate values may be used instead unless otherwise indicated. The classification of the items in the foregoing description are not fundamental to the present invention, and matters described in two or more items may be combined and used if necessary, or matters described in any item may be applied to matters described in other items (unless the matters are inconsistent). The boundaries of the functional parts or the processing parts in the functional block diagrams may not necessarily correspond to the boundaries of physical components. Operations of a plurality of functional parts may be performed physically by one component, or an operation of one functional part may be performed physically by a plurality of components. The order of the processes in the processing procedures described in the embodiments may be interchanged unless inconsistent. For the sake of convenience, the processes of the user apparatus 100 and the base station 200 have been described with reference to the functional block diagrams, however, these apparatuses may be realized by hardware, software, or a combination thereof. Software running on the processor included in the user apparatus 100 according to the embodiments of the present invention, and software running on the processor included in the base station 200 according to the embodiments of the present invention, may each be stored in any appropriate storage medium such as a RAM (Random Access Memory), a flash memory, a ROM (Read Only Memory), an EPROM, an EEPROM, a register, a HDD (Hard Disk Drive), a removable disk, a CD-ROM, a database, and a server.

Notifying the information is not limited to that of the aspect/embodiment described in this specification, and other methods may be employed. For example, notifying the information may be performed by physical layer signaling (for example, DCI (Downlink Control Information), UCI (Uplink Control Information)), upper layer signaling (for example, RRC (radio Resource Control) signaling, MAC (Medium Access Control) signaling, broadcast information (MIB (Master Information Block), SIB (System Information Block))), other signals, or combinations thereof. In addition, the RRC signaling may also be referred to as an RRC message, and may be an RRC Connection Setup message, an RRC Connection Reconfiguration message, or the like, for example.

Each aspect/embodiment described in this specification may be applied to LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA 2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), a system utilizing other appropriate systems, and/or next-generation systems extended based on such systems.

The order of the processing procedure, sequence, flow chart, or the like of each example/embodiment described in this specification may be interchanged unless contradictory. For example, the method described in this specification illustrate elements of the various steps in an exemplary order, and the order is not limited to the specific order that is illustrated.

Specific operation described in this specification as being performed by the base station 200 may in some cases be performed by an upper node. In a network formed by one or a plurality of network nodes having the base station 200, various operations that are performed for the communication with the user apparatus 100 may of course be performed by the base station 200 and/or another network node (for example, MME or S-GW or the like, but not limited to such) other than the base station 200. Although one network node other than the base station 200 is described in the above example, a combination of a plurality of other network nodes (for example, MME and S-GW) may be used.

Each example/embodiment described in this specification may be used independently, or used in combinations, or switched and used for execution.

The user apparatus 100 may in some cases be referred to by those skilled in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remove terminal, a handset, a user agent, a mobile client, a client or some other appropriate terminologies.

The base station 200 may in some cases be referred to by those skilled in the art as an NB (NodeB), an eNB (enhanced NodeB), a base station, or some other appropriate terminologies.

The terminologies "determining (judging)" and "deciding (determining)" used in this specification may include various types of operations. For example, "determining" or "deciding" may include deeming that a result of calculating, computing, processing, deriving, investigating, looking up (for example, search in a table, a database, or other data structure), or ascertaining is "determined" or "decided". In addition, "determining" or "deciding" may include deeming that a result of receiving (for example, receiving information), transmitting (for example, transmitting information), input, output, or accessing (for example, accessing data in a memory) is "determined" or "decided". Furthermore, "determining" or "deciding" may include deeming that a result of resolving, selecting, choosing, establishing, or comparing is "determined" or "decided". In other words, "determining" or "deciding" may include deeming that some type of operation is "determined" or "decided".

The expression "based on" used in this specification does not mean "based solely on" unless otherwise indicated. In other words, the expression "based on" means both "based solely on" and "based at least on".

The terminologies "include", "including", and variations thereof are intended to have an inclusive meaning, similar to the terminology "comprising", when these terminologies are used in this specification and claims. Further, the terminology "or" used in this specification and claims is not intended to mean an exclusive logical sum.

In this disclosure as a whole, in a case in which articles such as "a", "an", and "the" in English are added during translation, these articles may include indicating plural items unless clearly indicated otherwise from the context.

The present invention is described above in detail, however, it may be apparent to those skilled in the art that the present invention is not limited to the embodiments described in this specification. Various variations and modifications may be made without departing from the scope of the present invention determined by recitations of the claims. The description in this specification is exemplary, and the description in no way limits the scope of the present invention.

DESCRIPTION OF THE REFERENCE NUMERALS

100 User Apparatus
101 Signal Transmission Part
102 Signal Reception Part
103 Configuration Information Management Part
104 Transmission Power Determination Part
200 Base Station
201 Signal Transmission Part
202 Signal Reception Part
203 Configuration Information Management Part
204 Transmission Power Control Part
1001 Processor
1002 Memory
1003 Storage
1004 Communication Device
1005 Input Device
1006 Output Device

The invention claimed is:

1. A terminal comprising:
a receiver that receives a plurality of parameters that become candidates of a parameter to be used;
a processor that selects a parameter to be used, from the plurality of parameters, determines a pathloss estimation value using the selected parameter, and determines a transmission power of an uplink (UL) signal based on the pathloss estimation value; and
a transmitter that transmits the UL signal using the transmission power determined by the processor,
wherein the processor determines the parameter to be used from the plurality of parameters based on a Medium Access Control (MAC) signaling, and
wherein the UL signal, subject to the transmission power determination, is a Sounding Reference Signal (SRS) that is used for crosslink interference measurement.

2. The terminal as claimed in claim 1, wherein the receiver receives the plurality of parameters configured for each beam.

3. A base station comprising:
a transmitter that transmits a plurality of parameters that become candidates of a parameter to be used;
a receiver that receives an uplink (UL) signal transmitted from a terminal using a transmission power that is determined based on a pathloss estimation value, wherein a parameter to be used is selected from the plurality of parameters and the pathloss estimation value is determined using the selected parameter,
wherein the parameter to be used from the plurality of parameters is determined based on a Medium Access Control (MAC) signaling, and
wherein the UL signal, subject to the transmission power determination, is a Sounding Reference Signal (SRS) that is used for crosslink interference measurement.

4. A radio communication system comprising:
a terminal that comprises:
a first receiver that receives a plurality of parameters that become candidates of a parameter to be used;
a processor that selects a parameter to be used, from the plurality of parameters, determines a pathloss estimation value using the selected parameter, and determines a transmission power of an uplink (UL) signal based on the pathloss estimation value; and
a first transmitter that transmits the UL signal using the transmission power determined by the processor,
wherein the processor determines the parameter to be used from the plurality of parameters based on a Medium Access Control (MAC) signaling, and
wherein the UL signal, subject to the transmission power determination, is a Sounding Reference Signal (SRS) that is used for crosslink interference measurement, and
a base station that comprises:
a second transmitter that transmits the plurality of parameters; and
a second receiver that receives the UL signal.

5. An uplink (UL) signal transmission method executed by a terminal, comprising:
receiving a plurality of parameters that become candidates of a parameter to be used;
selecting a parameter to be used, from the plurality of parameters, determining a pathloss estimation value using the selected parameter, and determining a transmission power of an UL signal based on the pathloss estimation value;
transmitting the UL signal using the determined transmission power; and
determining the parameter to be used from the plurality of parameters based on a Medium Access Control (MAC) signaling,
wherein the UL signal, subject to the transmission power determination, is a Sounding Reference Signal (SRS) that is used for crosslink interference measurement.

* * * * *